(12) United States Patent
Jin et al.

(10) Patent No.: US 11,113,504 B2
(45) Date of Patent: Sep. 7, 2021

(54) WEARABLE ELECTRONIC DEVICE INCLUDING FINGERPRINT SENSOR

(71) Applicant: Samsung Electronics Co., Ltd., Gyeonggi-do (KR)

(72) Inventors: Yun Jang Jin, Gyeonggi-do (KR); Jeong Hoo Kim, Gyeonggi-do (KR); Kyung Hoon Song, Gyeonggi-do (KR); Bong Jae Rhee, Gyeonggi-do (KR); Se Young Jang, Gyeonggi-do (KR); Chi Hyun Cho, Gyeonggi-do (KR)

(73) Assignee: Samsung Electronics Co., Ltd., Suwon-si (KR)

(*) Notice: Subject to any disclaimer, the term of this patent is extended or adjusted under 35 U.S.C. 154(b) by 92 days.

(21) Appl. No.: 16/202,247

(22) Filed: Nov. 28, 2018

(65) Prior Publication Data

US 2019/0163953 A1 May 30, 2019

(30) Foreign Application Priority Data

Nov. 30, 2017 (KR) .................. 10-2017-0162729

(51) Int. Cl.
*G06K 9/00* (2006.01)
*G06K 9/20* (2006.01)
*G06K 9/62* (2006.01)

(52) U.S. Cl.
CPC ..... *G06K 9/00087* (2013.01); *G06K 9/00013* (2013.01); *G06K 9/00046* (2013.01);
(Continued)

(58) Field of Classification Search
CPC ........... G06K 9/00087; G06K 9/00013; G06K 9/00046; G06K 9/2027; G06K 9/6292; G06K 2009/0006; G06K 2009/03
See application file for complete search history.

(56) References Cited

U.S. PATENT DOCUMENTS

| 7,564,495 | B2 | 7/2009 | Lee |
| 8,773,847 | B2 * | 7/2014 | Byun ................. H04B 1/385 361/679.03 |

(Continued)

FOREIGN PATENT DOCUMENTS

| KR | 10-2006-0011788 A | 2/2006 |
| KR | 10-2015-0145729 A | 12/2015 |

(Continued)

OTHER PUBLICATIONS

International Search Report dated Apr. 12, 2019.
European Search Report dated Nov. 30, 2020.

*Primary Examiner* — Stephen G Sherman
(74) *Attorney, Agent, or Firm* — Cha & Reiter, LLC.

(57) ABSTRACT

Disclosed is an electronic device including a transparent member, a display, wherein at least part of the display is disposed under the transparent member, wherein the display includes an active area, in which a plurality of pixels capable of outputting light to display contents, a biometric sensor, wherein at least part of the biometric sensor is disposed in a first area outside the active area, and a reflector positioned to direct light reflected by an external object in contact with at least a partial area of the transparent member to the biometric sensor through at least a portion of the transparent member, wherein at least some of the plurality of pixels are positioned to irradiate the external object, thereby resulting in the light reflected by the external object.

7 Claims, 13 Drawing Sheets

(52) U.S. Cl.
CPC ......... *G06K 9/2027* (2013.01); *G06K 9/6292* (2013.01); *G06K 2009/0006* (2013.01); *G06K 2209/03* (2013.01)

(56) References Cited

U.S. PATENT DOCUMENTS

| | | | |
|---|---|---|---|
| 9,223,121 B2 | 12/2015 | Shin et al. | |
| 9,400,913 B2 | 7/2016 | Kim et al. | |
| 9,412,002 B2 | 8/2016 | Magi | |
| 10,157,305 B2 | 12/2018 | Wyrwas et al. | |
| 10,222,828 B2 | 3/2019 | Magi | |
| 2003/0053228 A1* | 3/2003 | Lee | A61B 5/103 359/860 |
| 2004/0041998 A1* | 3/2004 | Haddad | G06K 9/00033 356/71 |
| 2006/0279653 A1* | 12/2006 | Lee | H04N 5/2251 348/335 |
| 2009/0073142 A1* | 3/2009 | Yamashita | G06F 3/0421 345/176 |
| 2012/0147168 A1 | 6/2012 | Shin et al. | |
| 2012/0242622 A1* | 9/2012 | Tseng | G06F 3/0428 345/175 |
| 2014/0168167 A1* | 6/2014 | Chou | G06K 9/00026 345/175 |
| 2015/0022648 A1 | 1/2015 | Kim et al. | |
| 2015/0186705 A1 | 7/2015 | Magi | |
| 2016/0283772 A1* | 9/2016 | Nelson | G06K 9/00 |
| 2016/0320796 A1 | 11/2016 | Magi | |
| 2017/0109561 A1 | 4/2017 | Wyrwas et al. | |
| 2017/0147865 A1 | 5/2017 | Jensen et al. | |
| 2017/0371431 A1 | 12/2017 | Kim et al. | |
| 2018/0349673 A1* | 12/2018 | Lin | G02B 27/46 |

FOREIGN PATENT DOCUMENTS

| | | |
|---|---|---|
| KR | 10-2016-0083690 A | 7/2016 |
| KR | 10-1726613 B1 | 4/2017 |

* cited by examiner

WEARABLE ELECTRONIC DEVICE INCLUDING FINGERPRINT SENSOR

CROSS-REFERENCE TO RELATED APPLICATION(S)

This application is based on and claims priority under 35 U.S.C. § 119 to Korean Patent Application No. 10-2017-0162729, filed on Nov. 30, 2017, in the Korean Intellectual Property Office, the disclosure of which is incorporated by reference herein its entirety.

BACKGROUND

1. Field

The present disclosure relates to a wearable electronic device including a fingerprint sensor.

2. Description of Related Art

Electronic devices, such as mobile devices which include smartphones are storing increasing amount of a user's personal information. Accordingly, it has become increasingly important to authenticate the user to avoid unauthorized access and misuse of a person's private information.

The above information is presented as background information only to assist with an understanding of the present disclosure. No determination has been made, and no assertion is made, as to whether any of the above might be applicable as prior art with regard to the present disclosure.

SUMMARY

User authentication technologies include a fingerprint recognition technology. The electronic device including a fingerprint sensor, to which a fingerprint recognition technology is applied, may authenticate a user by comparing collected fingerprint information with fingerprint information registered through a fingerprint registering process when the user is authenticated.

However, in a wearable electronic device such as a wearable watch, the front part of the wearable electronic device is thicker compared to a smartphone device. Accordingly, it is more difficult to recognize a fingerprint using a structure where a fingerprint sensor is disposed under a display. For example, in the wearable electronic device, it is difficult to receive refracted light necessary for sensing a fingerprint. This can be due to crosstalk, such as internal diffused reflection, due to the thickness of the front part of the wearable electronic device. Further, in the wearable electronic device, it is difficult to collect light that is necessary for sensing a fingerprint because the distance between the surface of the front part and the fingerprint sensor is relatively large, and interference caused by the display.

Aspects of the present disclosure may address at least the above-mentioned problems and/or disadvantages and may provide at least the advantages described below. Accordingly, an aspect of the present disclosure may provide an electronic device including a fingerprint sensor that may support an improved fingerprint sensing function even in a structure of a wearable electronic device having a relatively thick front part.

In accordance with an aspect of the present disclosure, there is provided an electronic device including a transparent member, a display, wherein at least part of the display is disposed under the transparent member, wherein the display includes an active area, in which a plurality of pixels capable of outputting light to display contents, a biometric sensor, wherein at least part of the biometric sensor is disposed in a first area outside the active area, and a reflector positioned to direct light reflected by an external object in contact with at least a partial area of the transparent member to the biometric sensor through at least a portion of the transparent member, wherein at least some of the plurality of pixels are positioned to irradiate the external object, thereby resulting in the light reflected by the external object.

In accordance with another aspect of the present disclosure, there is provided a wearable electronic device comprising a front plate having a specific transparency, a display under the front plate, a housing, at least a portion of which surrounds an edge of the front plate, a support member on which the front plate and the display are positioned, a rear plate on which the support member is positioned and coupled to the housing, and a fingerprint sensor, wherein at least part of the fingerprint sensor is disposed on a side of the front plate and under an edge of the housing and configured to receive light related to a fingerprint of a finger in contact with a specific area of the front plate to and receive fingerprint information from the fingerprint.

According to embodiments of the present disclosure, even a wearable electronic device including a relatively thick front part may provide an excellent fingerprint sensing function.

In addition, the present disclosure may provide various effects that are directly or indirectly recognized.

Other aspects, advantages, and salient features of the disclosure will become apparent to those skilled in the art from the following detailed description, which, taken in conjunction with the annexed drawings, discloses certain embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

With regard to description of drawings, the same or similar components may be marked by the same or similar reference numerals.

DETAILED DESCRIPTION

Hereinafter, certain embodiments of the present disclosure will be described with reference to the accompanying drawings. Accordingly, those of ordinary skill in the art will recognize that modification, equivalent, and/or alternative on the certain embodiments described herein can be variously made without departing from the scope and spirit of the present disclosure.

Figure 1:
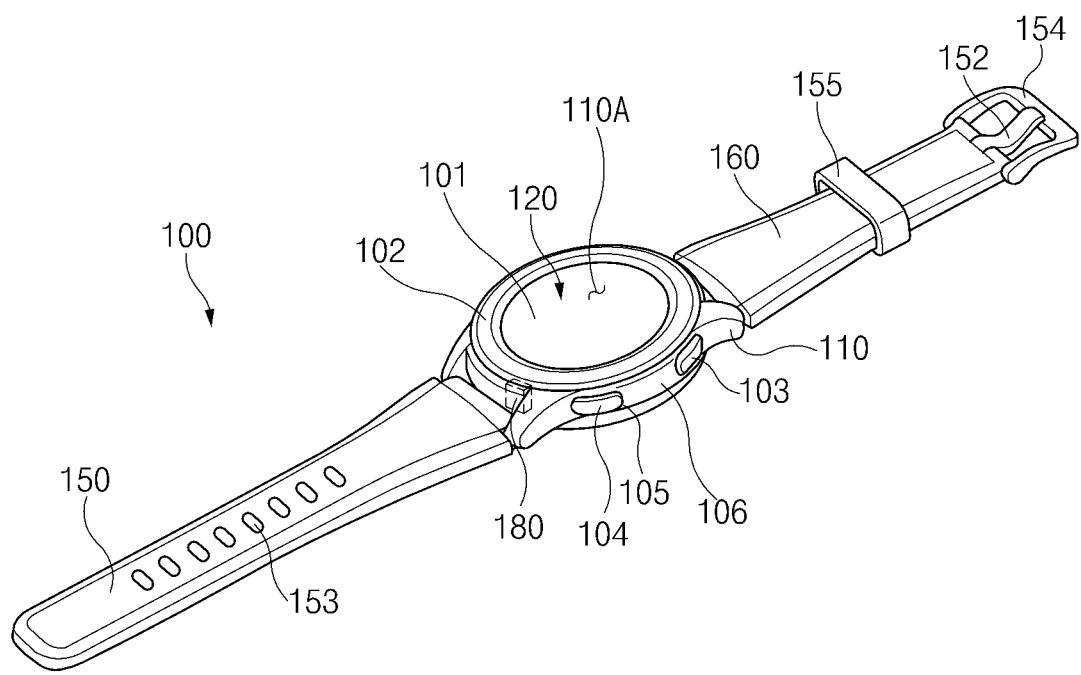
FIG. 1 is a perspective view of a front surface of a wearable electronic device according to an embodiment.
Figure 2:
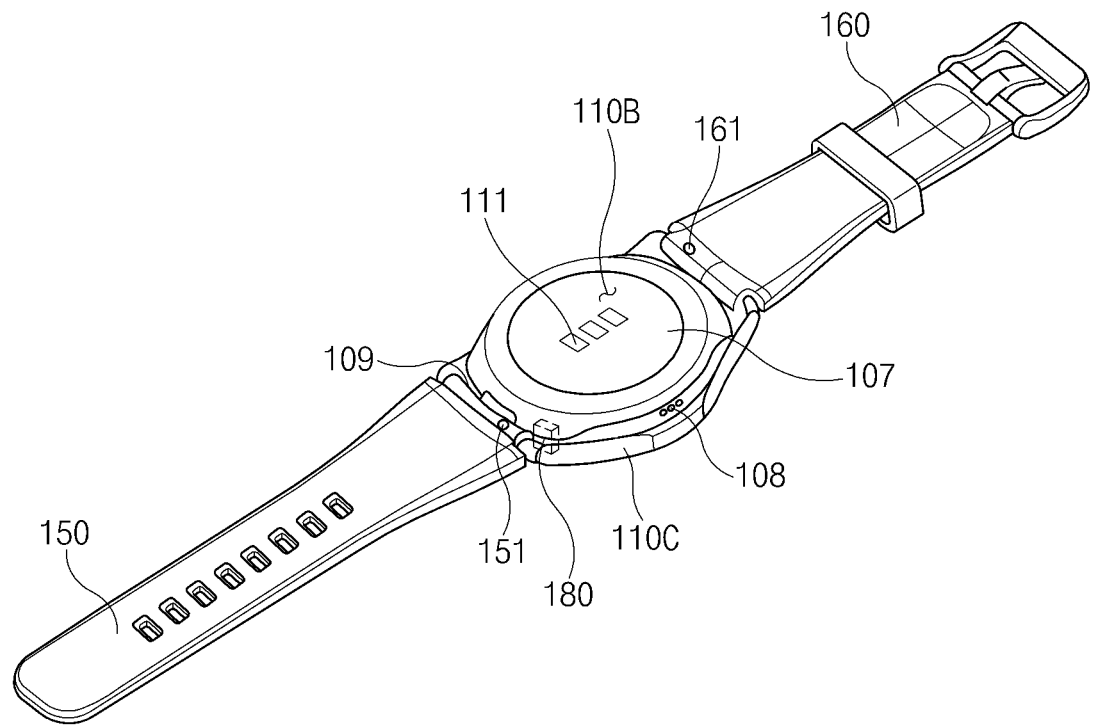
FIG. 2 is a perspective view of a rear surface of the electronic device of FIG. 1.
Figure 3:
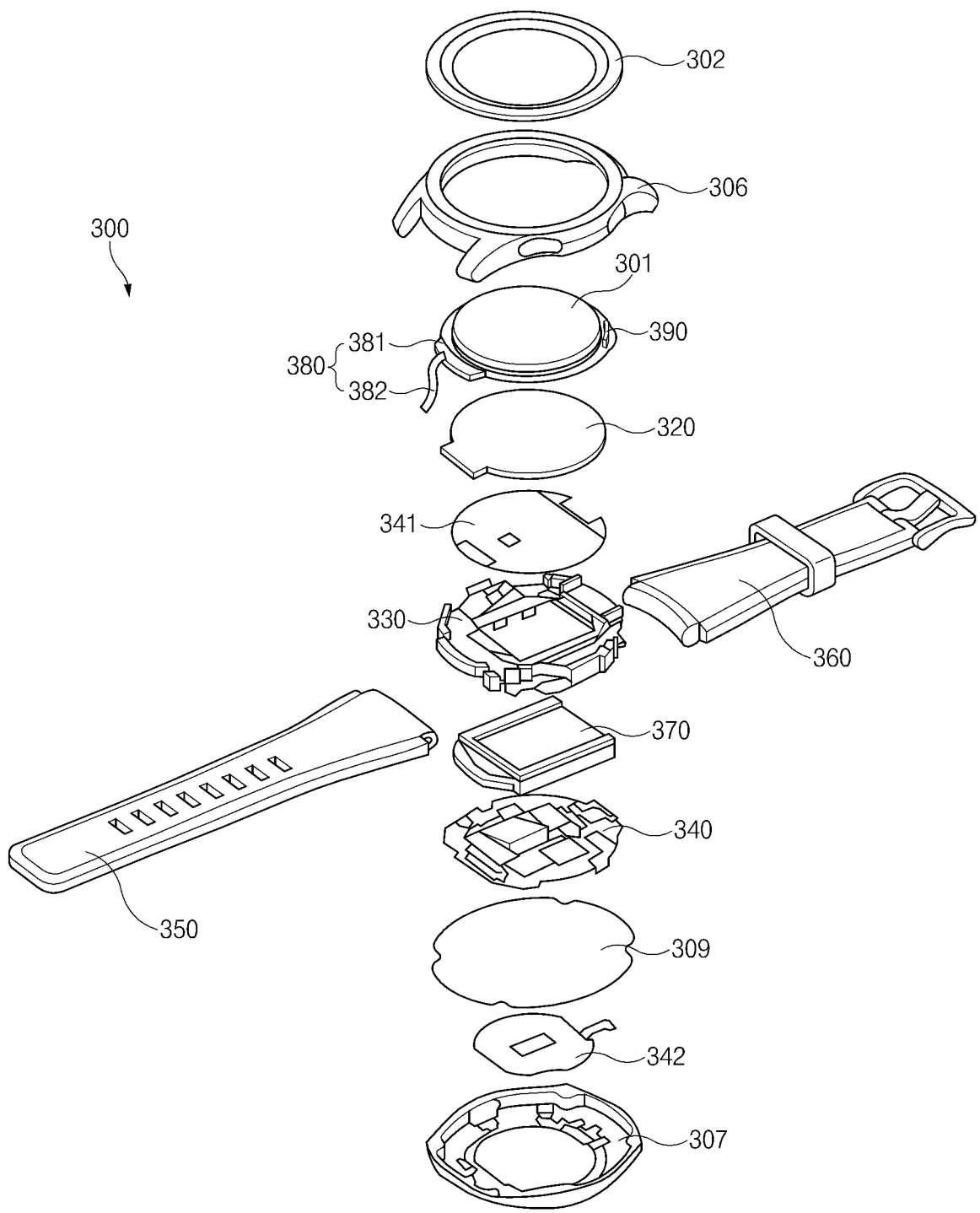
FIG. 3 is a deployed perspective view of the electronic device of FIG. 1.

FIG. 1 is a perspective view of a front surface of a wearable electronic device according to an embodiment. FIG. 2 is a perspective view of a rear surface of the wearable electronic device of FIG. 1. FIG. 3 is a deployed perspective view of the wearable electronic device of FIG. 1.

Referring to FIGS. 1 and 2, a wearable electronic device 100 according to an embodiment may include a housing including a first surface (or a front surface) 110A, a second surface (or a rear surface) 110B, and a side surface 110C surrounding a space between the first surface 110A and the second surface 110B. Fastening members 150 and 160 may be connected to at least portions of the housing 110. and the fastening members 150 and 160 are configured to detachably fasten the wearable electronic device 100 to a portion (e.g., a neck, a wrist, or an ankle) of the body of the user. The fastening members 150 and 160 may be formed of various material and have various shapes. A single body or a plurality of unit links that may move with respect to each other may be formed of woven fabric, leather, rubber, urethane, a metal, ceramics, or a combination of at least two thereof.

In another embodiment (not illustrated), the housing 110 may refer to a structure that forms some of the first surface 110A, the second surface 110B, and the side surface 110C of FIG. 1. According to an embodiment, the first surface 110A may be formed by a front plate (or a transparent member, hereinafter, referred to as a front plate) (301 of FIG. 3) (e.g., a glass plate including at least one coating layer or a polymer plate), at least a portion of which is substantially transparent. The second surface 110B may be formed by a rear plate 107 that is substantially opaque.

The rear plate 107, for example, may be formed of coated or colored glass, ceramics, a polymer, a metal (e.g., aluminum, stainless steel (STS), or magnesium), or a combination of at least two thereof. The side surface 110C is coupled to the front plate 301 and the rear plate 107, and may be formed by a side bezel structure 106 (or 'a side member') including a metal and/or a polymer. In some embodiments, the rear plate 107 and the side bezel structure 106 may be integrally formed and may include the same material (e.g., a metallic material such as aluminum).

According to an embodiment, the wearable electronic device 100 may include at least one of a display 120 disposed under the front plate 101, audio modules 105 and 108, a sensor module 111, key input devices 102, 103, and 104, a connector hole 109, and a fingerprint sensor 180. In some embodiments, at least one (e.g., the key input devices 102, 103, and 104, the connector hole 109, or the sensor module 111) may be omitted from the wearable electronic device 100 or another component may be additionally included in the wearable electronic device 100.

The display 120, for example, may be exposed through an upper end portion of the front plate 101. The shape of the display 120 may correspond to the shape of the front plate 101, and may include various shapes, such as a circular shape, an elliptical shape, or a polygonal shape. The display 120 may be coupled to or be disposed to be adjacent to (or directly over, or under a touch detection circuit, a pressure sensor that may measure the strength (a pressure) of a touch, and/or a fingerprint sensor.

The audio modules 105 and 108 may include a microphone hole 105 and a speaker hole 108. A microphone for obtaining an external sound may be disposed in the interior of the microphone hole 105. In some embodiments, a plurality of microphones and a plurality of microphone holes may be disposed to detect the direction of a sound. The speaker hole 108 may be used for an external speaker and a communication receiver. In some embodiments, the speaker hole 107 and the microphone hole 105 may be realized by one hole or a speaker may be included while a speaker hole 107 is not employed (e.g., a piezoelectric speaker).

The sensor module 111 may generate an electrical signal or a data value corresponding to an operation state of the interior of the wearable electronic device 100 or an environmental state of the outside. The sensor module 111, for example, may include a biometric sensor module 111 (e.g., a Heart Rate Monitor (HRM) sensor) disposed on the second surface 110B of the housing 110. The wearable electronic device 100 may further include a sensor module (not illustrated), for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or an illumination sensor.

The key input devices 102, 103, and 104 may include a wheel key 102 disposed on the first surface 110A of the housing 110 and being rotatable in at least one direction, and/or side key buttons 103 and 104 disposed on the side surface 110C of the housing 110. The wheel key 102 may have a shape corresponding to the shape of the front plate 102. In another embodiment, the wearable electronic device 100 may not include some or all of the above-mentioned key input devices 102, 103, and 104, and the key input devices 102, 103, and 104 which are not included, may be realized in different forms, such as a soft key, on the display 320.

The connector hole 109 may accommodate a connector (e.g., a USB connector) for transmitting and receiving power and/or data to and from an external electronic device, and may include another connector hole (not illustrated) that may accommodate a connector for transmitting and receiving an audio signal to and from an external electronic device. The wearable electronic device 100, for example, may further include a connector cover (not illustrated) configured to cover at least a portion of the connector hole 109 to interrupt introduction of external foreign substances through the connector hole 109.

The fastening members 150 and 160 may be detachably fastened to at least a partial area of the housing 110 by using locking members 151 and 161. The fastening members 150 and 160 may include one or more of a fixing member 152, a fixing member coupling hole 153, a band guide member 154, and a band fixing ring 155.

The fixing member 152 may be configured to fix the housing 110 and the fastening members 150 and 160 to a portion (e.g., a wrist or an ankle) of the body of the user. The fixing member coupling hole 153 may fix the housing 110 and the fastening members 150 and 160 to a portion of the body of the user in correspondence to the fixing member 152. The band guide member 154 may be configured to restrict a motion range of the fixing member 152 when the fixing member 152 is coupled to the fixing member coupling hole 153 so that the fastening members 150 and 160 are fastened to be attached to a portion of the body of the user. The band fixing ring 155 may restrict motion ranges of the fastening members 150 and 160 in a state in which they fixing member 152 and the fixing member coupling hole 153 are coupled to each other.

The fingerprint sensor 180 may be disposed on a side of the front plate 101 and inside a lower portion of the housing 110. The side of the front plate 101 may include an inactive area of the display 120. According to an embodiment, the display 120 may include an active area and an inactive area, and the fingerprint sensor 180 may be disposed on the inactive area of the display 120. In certain embodiments, the active area of the display 120 can include the area of the display that is visible through the front surface 110A. The fingerprint sensor 180 may either receive light reflected from the fingerprint of a finger in contact with the upper surface of the front plate 101 or may receive the light through a reflector disposed on a side of the front plate 101. The fingerprint sensor 180 may deliver the collected light information to a processor.

The fingerprint sensor 180 may identify from the received light information, whether a fingerprint on a finger matches previously stored fingerprint information and may transmit the identification result to the processor. In certain embodiments, the previously stored fingerprint information can be provided when the user initially obtains the electronic device 100 during a first-time configuration procedure. Accordingly, access to the electronic device 100 can be conditioned upon the fingerprint sensor 180 identifying the same fingerprint provided during first-time configuration procedure. Thus, access to private information stored in the electronic device 100 can be restricted to the person bearing the fingerprint provided during the first-time configuration procedure.

In order to improve the light reception capacity of the fingerprint sensor 180, the fingerprint sensor 180 may be disposed such that an orientation direction of a light receiving part that receives light for the fingerprint sensor is an area (e.g., a central area of the front plate 101 which a central portion of a fingerprint contacts) of the front plate 101, which the fingerprint contacts.

Referring to FIG. 3, the wearable electronic device 300 (e.g., the wearable electronic device 100) may include a side bezel structure 306 (e.g., the side bezel structure 106), a wheel key 302 (e.g., the wheel key 102), a front plate 301 (e.g., the front plate 101), a display 320 (e.g., the display 120), a first antenna 341, a second antenna 342, a support member 330 (e.g., a bracket), a battery 370, a printed circuit board 340, a sealing member 309, a rear plate 307 (e.g., the rear plate 107), a fingerprint sensor 380 (e.g., the fingerprint sensor 180), a reflector 390 (or reflection member), and fastening members 350 and 360 (e.g., the fastening members 150 and 160).

In certain embodiments, the display 320 includes pixels that radiate light. An external object making contact with the front plate 301, such as a fingerprint on a finger, reflects the radiated light from the pixels of the display 320. The light reflected by the external object is received by a biometric sensor, such as the fingerprint sensor 380. In certain embodiments, a reflector directly light reflected by the external object through the front plate 301.

At least one of the components of the wearable electronic device 300 may be the same as or similar to at least one of the components of the wearable electronic device 100 of FIGS. 1 and 2, and a repeated description thereof will be omitted. The support member 330 may be disposed in the interior of the wearable electronic device 300 to be connected to the side bezel structure 306 or to be integrally formed with the side bezel structure 306. The support member 330, for example, may be formed of a metallic material and/or a nonmetallic material (e.g., a polymer). The display 320 may be coupled to one surface of the support member 330, and the printed circuit board 340 may be coupled to an opposite surface of the support member 330. A processor, a memory, and/or an interface may be mounted on the printed circuit board 340. The processor, for example, may include one or more of a central processing unit, an application processor, a graphic processing unit (GPU), an application processor, a sensor processor, or a communication processor.

The memory, for example, may include a volatile and/or nonvolatile memory. The interface, for example, may include a high definition multimedia interface (HDMI), a universal serial bus (USB), an SD card interface, and/or an audio interface. The interface, for example, may electrically or physically connect the wearable electronic device 300 to an external electronic device, and may include a USB connector, an SD card/MMC connector, and an audio connector. In certain embodiments, the memory can store a previously recorded fingerprint for matching by the fingerprint sensor.

The battery 370 is a device for supplying electric power to at least one component of the wearable electronic device 300, and for example, may include a primary battery that cannot be recharged, a secondary battery that may be recharged, or a fuel cell. At least a portion of the battery 370, for example, may be disposed on substantially the same plane as the printed circuit board 340. The battery 370 may be integrally disposed in the interior of the wearable electronic device 100, and may be disposed to be detachable from the wearable electronic device 300.

The first antenna 341 may be disposed between the display 320 and the support member 360. The first antenna 341, for example, may include a near field communication (NFC) antenna, a wireless charging antenna, and/or a magnetic secure transmission (MST) antenna. The first antenna 341, for example, may perform short-range communication with an external device, may wirelessly transmit and receive electric power that is necessary for charging, and may transmit a short range communication signal or a magnetism-based signal including payment data. In another embodiment, an antenna structure may be formed by one or a combination of the side bezel structure 306 and/or the support member 360.

The second antenna 342 may be disposed between the circuit board 380 and the rear plate 307. The second antenna 342, for example, may include a near field communication (NFC) antenna, a wireless charging antenna, and/or a magnetic secure transmission (MST) antenna. The second antenna 342, for example, may perform short-range communication with an external device, may wirelessly transmit and receive electric power that is necessary for charging, and may transmit a short range communication signal or a magnetism-based signal including payment data. In another embodiment, an antenna structure may be formed by one or a combination of the side bezel structure 306 and/or the rear plate 307.

The sealing member 309 may be located between the side bezel structure 306 and the rear plate 307. The sealing member 309 may be configured to interrupt moisture and foreign substances that are introduced into a space surrounded by the side bezel structure 306 and the rear plate 307 from the outside.

The fingerprint sensor 380 may be disposed between the housing 306 and the front plate 301. The fingerprint sensor 380, for example, may include a sensor part 381 and a sensor wiring part 382. The sensor part 381 may be disposed on a side surface of the front plate 301, and may collect light irradiated from the display 320 toward the front plate 301 and reflected by a fingerprint in contact with a surface of the front plate 301, directly or through the reflection member 390. One side of the sensor wiring part 382 may be connected to the sensor part 381, and an opposite side of the sensor wiring part 382 may be connected to a sensor IC (not illustrated). The sensor IC may be disposed at an end of the sensor wiring part 382 or may be disposed on the printed circuit board 340. The sensor wiring part 382, for example, may be formed of an FPCB. An area of the fingerprint sensor 380, in which light is collected, may be disposed to face a central area of the front plate 301 or to face a central portion of the reflection member 390 such that collection of the light may be concentrated in the area.

According to certain embodiments, the wearable electronic device 300 may include a reflector 390 positioned to direct light to the fingerprint sensor 380. The reflector 390 may be positioned to face a specific point (e.g., a point which a central portion of a fingerprint contact, for example, a central area of the front plate 301) of the front plate 301. The light reflected through a surface of the reflection member 390 may be directed toward the fingerprint sensor 380 after crossing a transverse central portion of the front plate 301. In certain embodiments, the fingerprint sensor 380 and the reflector 390 in the housing, directly below the side bezel structure 306, so as not to be directly visible.

The wearable electronic device 300 according to certain embodiments may receive light irradiated by the display 320, by using a side surface of the front plate 301, to provide a light transmission medium that results in low or minimal loss of light due to the display 320, as compared to light that is received by a lower side of the display 320. For example, the wearable electronic device 300 may sense a fingerprint by using an RGB camera of a relatively low resolution because the camera for sensing a fingerprint is disposed on a side of the front plate 301, instead of the lower side of the display 320. Further, the wearable electronic device 300 according to certain embodiments may secure proper focal distance that is necessary for the fingerprint sensor 380 to receive light by using reflection sensor 390. For example, the distance between the fingerprint sensor 380 and the reflector 390 of the wearable electronic device 300 may be equal, substantially equal, or within 10 percent of the focal distance of the fingerprint sensor 380.

According to certain embodiments, the electronic device (or the wearable electronic device) according to an embodiment may include a transparent member (e.g., the front plate), a display disposed under the transparent member and including an active area in which a plurality of pixels that may output light to display contents are disposed, a biometric sensor (e.g., the fingerprint sensor) disposed in a first area outside the active area, and a reflector positioned to direct light reflected by an external object in contact with at least a partial area of the transparent member. Further, according to certain embodiments, the electronic device (or the wearable electronic device) may include a reflector disposed in a second area outside the active area and configured to change an optical path of the reflected light such that at least a portion of the reflected light reflected by an external object in contact with at least a partial area of the transparent member, among the light output from at least some of the plurality of pixels may be delivered to the biometric sensor through at least a portion of the transparent member. At least some of the plurality of pixels are positioned to irradiate the external object, thereby resulting in the light reflected by the external object.

Figure 4:
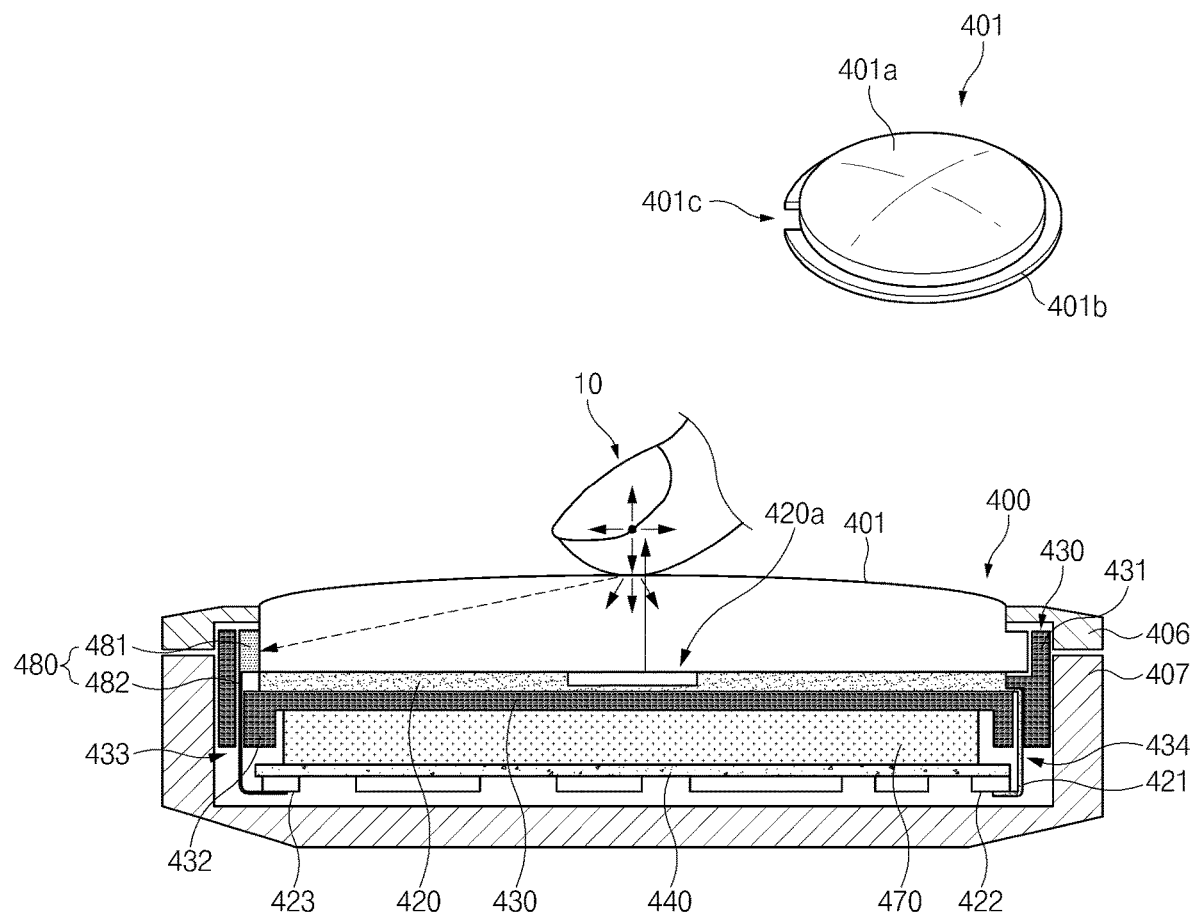
FIG. 4 is a view illustrating a configuration of a wearable electronic device including a side disposed fingerprint sensor substrate according to an embodiment of the present disclosure.

FIG. 4 is a view illustrating a configuration of a wearable electronic device including a side disposed fingerprint sensor substrate according to an embodiment of the present disclosure.

Referring to FIG. 4, a configuration of the wearable electronic device 400 according to an embodiment may include a front plate 401, a display 420, a housing 406, a support member 430, a battery 470, a printed circuit board 440, a fingerprint sensor 480, and a rear plate 407. Additionally or alternatively, at least one of the components described above with reference to FIGS. 1 to 3 may be included.

The front plate 401 may have a specific transparency such that the display 420 may be observed from the outside. For example, the front plate (or the transparent member) 401 may be formed of a glass material or a transparent polymeric material. The front plate 410 may be formed such that the thickness of a central area 401a thereof is larger than the thickness of an edge 401b thereof as a whole.

According to an embodiment, in the front plate 401, an upper side of the central area 401a may be formed such that it becomes thinner from a central portion thereof toward the outskirt thereof and may be rounded to have a specific curvature from the central portion to the outskirt of the upper side of the central area 401a. A lower surface of the central area 401a of the front plate 401 may be formed flat. The edge 401b of the front plate 401 may be configured to have a band shape having a specific thickness. Accordingly, the front plate 401 may be configured to have a hat shape as a whole. The central area 401a of the front plate 401 may be exposed to the outside through a central portion of the housing 406. The edge 401b of the front plate 401 may be disposed under the housing 406 such that the front plate 401 may not deviate from the housing 406. According to certain embodiments, a packing part for waterproofing or protection against dust may be disposed between the edge 401b of the front plate 401 and the housing 406. According to an embodiment of the present disclosure, a sensor disposition recess 401c may be provided at the edge 401b of the front plate 401 such that at least one fingerprint sensor 480 may be disposed. Although a structure in which one fingerprint sensor is disposed has been shown in the illustrated drawings, the present disclosure is not limited thereto. For example, the wearable electronic device 400 may include a plurality of fingerprint sensors disposed at the edge of the front plate at a specific interval. In this case, a plurality of sensor disposition recesses may be provided in the front plate 401.

The display 420 may be disposed between the front plate 401 and the support member 430. The display 420 may have various shapes according to the shape of the wearable electronic device 400. According to an embodiment, the display 420 may be a circular display or a polygonal display. The display 420 may output various screens according to management of the wearable electronic device 400. For example, the display 420 may output a time display screen, a standby screen, a menu screen, a fingerprint sensing screen, a fingerprint sensing based specific function execution screen, and the like. The fingerprint sensing screen, for example, may include a screen which emits light such that pixels of at least a partial area of the display 420 have a specific intensity of illumination or a specific color. For example, as illustrated, the display 420 may emit light such that a light irradiation area 420a for sensing a fingerprint may have a specific intensity of illumination or a specific color in correspondence of control of the processor of the wearable electronic device 400. The light irradiation area 420a may be the entire area of the display 420 or a specific central area of the display 420. The light irradiated by the light irradiation area 420a may be irradiated toward the front plate 401, and may be reflected by the fingerprint 10 in contact with a surface of the front plate 401 and be directed to the fingerprint sensor 480. According to certain embodiments, the display 420 may output a guide screen related to authentication of a fingerprint. The guide screen may include an image that indicates an ideal area to place the finger (e.g., the center or a specific area of the front plate) of the fingerprint sensor.

The housing 406 may be disposed to surround the edge of the front plate 401 while being positioned on the front plate 401. The housing 406 may be coupled to the rear plate 407. The fingerprint sensor 480 may be disposed on one side of a lower portion of the housing 406.

An upper positioning part 431, on which the display 420 and the front plate 401 are positioned, may be provided at an upper portion of the support plate 430, and a lower positioning part 432, on which the battery 470 is positioned, may be provided at a lower portion of the support member 430. The support member 430 may have a cylindrical shape, a central portion of which is closed by a plate of a specific thickness as a whole. Additionally or alternatively, the support member 430 may include a first wiring hole 433 in which a sensor wiring part 482 provided in the fingerprint sensor 480 is disposed and a second wiring hole 434 in which a display wiring part 421 connected to the display 420 is disposed. The first wiring hole 433 and the second wiring hole 434 may pass through the upper and lower sides of the support member 430.

The battery 470 may be disposed between the support member 430 and the printed circuit board 440, and may be positioned on the lower positioning part 432 provided under the support member 430. The battery 470 may supply electric power that is necessary for management of a function of the wearable electronic device 400 according to control of a processor (or a power management circuit) disposed in the printed circuit board 440.

The printed circuit board 440 may be disposed between a lower side of the battery 470 and the rear plate 407. The printed circuit board 440 may include a display connector 422 electrically connected to the display wiring part 421 connected to the display 420. The printed circuit board 440 may include a sensor connector 480 electrically connected to the sensor wiring part 482 connected to the fingerprint sensor 480.

The fingerprint sensor 480 may be disposed on one side of an upper positioning part 431 of the support member 430. The fingerprint sensor 480, for example, may include a sensor part 481 and a sensor wiring part 482. The sensor part 481 may include an RGB camera sensor having a specific resolution that is suitable for sensing of a fingerprint. The sensor part 481 may be disposed to face one side of a side wall of the front plate 401, and a focal direction of the sensor part 481 may be a specific area (e.g., an upper surface of a central area) of the front plate 401. The focal direction of the sensor part 481 may be changed to an edge area of the front plate 401 according to a change of a design scheme. The sensor wiring part 482 connected to the sensor part 481 may direct light collected by the sensor part 481 to the processor mounted on the printed circuit board 440 and the like through the sensor connector 423. In some embodiments, the sensor part can be under the bezel 406 and adjacent to the front plate 401.

The printed circuit board 440, the battery 470, the display 420, the support member 430, and the like may be positioned on the rear plate 407, and the rear plate 407 may be coupled to the housing 406. At least a portion of the side wall of the rear plate 407 may be disposed to surround an outskirt of the support member 430.

As described above, the wearable electronic device 400 according to an embodiment of the present disclosure may obtain a sensor signal (or light) that is necessary for sensing a fingerprint regardless the thickness of the front plate 401 as the fingerprint sensor 480 is disposed on a side of the front plate 401, and may collect a sensor signal that is necessary for sensing a fingerprint without any interference by the display 420 because the fingerprint sensor 480 is disposed under the display 420.

Figure 5A:
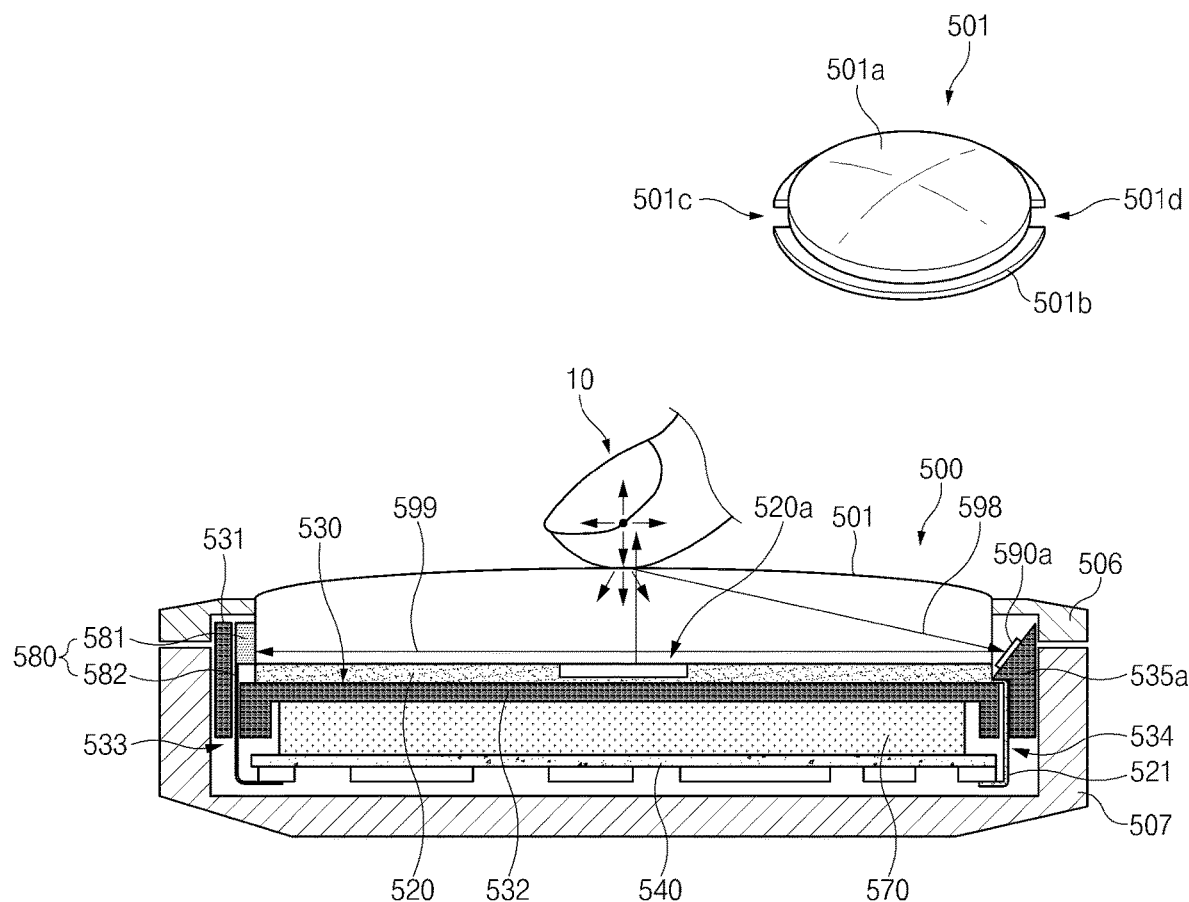
FIG. 5A is a view illustrating an example of a configuration of a wearable electronic device in which a reflection member is disposed in a support member according to an embodiment of the present disclosure.

FIG. 5A is a view illustrating an example of a configuration of a wearable electronic device in which a reflector 590a is positioned in a support member according to an embodiment of the present disclosure;

Referring to FIG. 5A, the wearable electronic device 500 according to an embodiment may include a front plate 501, a display 520, a housing 506, a support member 530, a battery 570, a printed circuit board 540, a fingerprint sensor 580, a first reflection member 590a, and a rear plate 507. Additionally or alternatively, at least one of the components described above with reference to FIGS. 1 to 3 may be included.

In the above-mentioned configuration, the display 520, the housing 506, the battery 570, the printed circuit board 540, and the rear plate 507 may be the same as or similar to the display 420, the housing 401, the battery 470, the printed circuit board 440, and the rear plate 407 described above with reference to FIG. 4.

The front plate 501 may include a central area 501a formed such that the thickness of a central portion thereof is larger than the thickness of an edge portion thereof and an edge 501b surrounding a periphery of the central area 501a, and a reflection member disposition recess 501d and a sensor disposition recess 501c may be provided on opposite sides of the edge 501b. The reflection member disposition recess 501d and the sensor disposition recess 501c may be disposed to be symmetrical, substantially symmetrical, or within 1%~10% deviation of symmetrical to each other with respect to the central area 501a.

The support member 530 may include an upper positioning part 531 on which the front plate 501 and the display 520 are positioned, a lower positioning part 532 on which the battery 570 is positioned, a first wiring hole 533, through which the sensor wiring part 582 disposed in the fingerprint sensor 580 passes, and a second wiring hole 534, through which the display wiring part 521 passes. The upper positioning part 531 may include a vessel form, the bottom of which is flat as a whole. The fingerprint sensor 580 may be fixed to an area of the upper positioning part 531, which corresponds to the sensor disposition recess 501c. The first reflection member 590a may be disposed in a first reflection member area 535a of the upper positioning part 531, which corresponds to the reflection member disposition recess 501d. The first reflection member area 535a may have a surface form having a specific inclination such that the first reflection member 590a is fixed while being inclined at a specific inclination.

The fingerprint sensor 580 may include a sensor part 581 and a sensor wiring part 582. The fingerprint sensor 580 may be disposed under the housing 506 and in an area of the side surface of the front plate 501, which corresponds to the sensor disposition recess 501c. The fingerprint sensor 580 (or a light receiving part) may be disposed to face the first reflector 590a while crossing a transverse direction of the front plate 501. According to various embodiments, the display 520 may include an active area in which pixels are disposed, and an inactive area disposed on an outskirt of the active area, and not visible when viewed from directly above the electronic device 500. The fingerprint sensor 580 may be disposed in a first area (or a first area of a specific location of the inactive area) except for the active area of the display 520.

The reflector 590a may be disposed on one side of the upper positioning part 531 of the support member 530 (e.g., one side of an area corresponding to the reflection. member disposition recess 501d). The reflector 590a, for example, may have front and rear surfaces thereof are flat and be configured to reflect light on the front surface thereof. The first reflector 590a is configured to be focused on a central portion of the front plate 501. The first reflector 590a, may be position to direct light from the central portion of the front plate 501 (e.g., optical path 598 is changed to optical path 599) to the fingerprint sensor 580 disposed on an opposite side with respect to the central area 501a of the front plate 501. In this regard, the first reflector 590a may be positioned in the first reflector area 535a having a specific inclination. According to certain embodiments, the first fingerprint member 590a may be disposed in a second area (or a second area of a specific location of an inactive area of the display 520) outside of the active area of the display 520. The first area, in which the fingerprint sensor 580 is disposed, and a second area, in which the first reflector 590a is disposed, may correspond to locations at which the fingerprint sensor 580 and the first reflection member 590a may face each other.

The first reflector 590a can be inclined at an angle such that a line from the top of the central portion of the front plate 501 makes an angle of incidence that result in an angle of refraction, wherein a line from the point of incidence is substantially parallel to the base of the housing.

According to an embodiment, the wearable electronic device 500 may irradiate light to a specific area (e.g., a central area) of the front plate 501 through the light irradiation area 520a of the display 520. Accordingly, the light reflected by a fingerprint 10 of a finger in contact with a surface of the front plate 501 is reflected by the first reflector 590a and the light reflected by the first reflector 590a may be directed to the fingerprint sensor 580 through a side of the front plate 501. In this process, because the light related to sensing of a fingerprint travels through the front plate 501, the fingerprint sensor 580 may sense a fingerprint with better resolution than a fingerprint sensor 580 that is disposed under the display 520. For example, the fingerprint sensor 580 may sense a fingerprint with a relatively excellent quality as compared with an environment in which the fingerprint sensor 580 that is disposed under the display 520.

According to certain embodiments, the wearable electronic device 500 may output a guide screen related to sensing of a fingerprint through the display 520. The guide screen may include an image that indicates a focal area (e.g., a central area of the front plate) of the reflector.

According to certain embodiments, the wearable electronic device 500 may include a plurality of fingerprint sensors and a plurality of sensor disposition recesses corresponding thereto, and may include a plurality of reflectors corresponding to the fingerprint sensors.

Figure 5B:
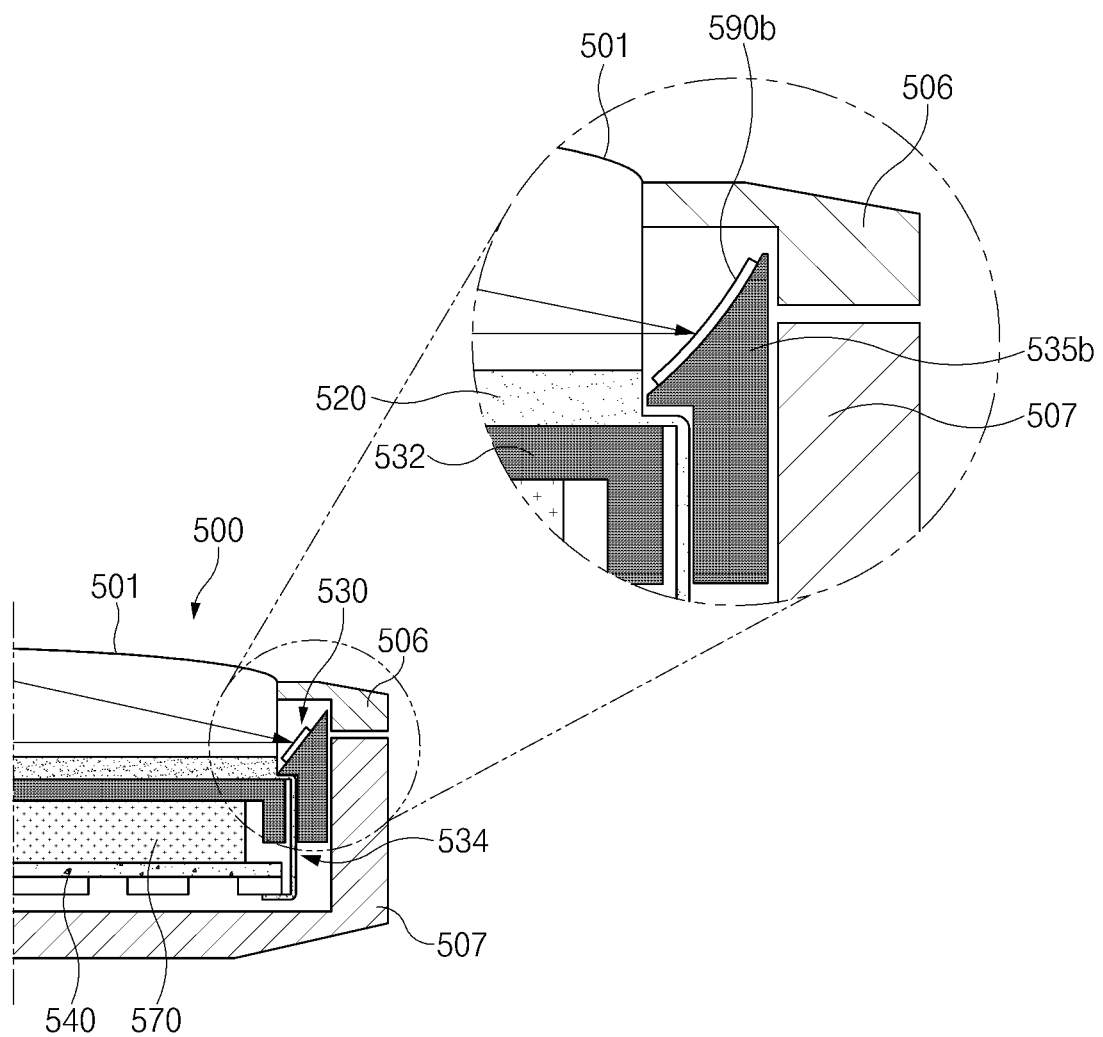
FIG. 5B is a view illustrating another example of a configuration of a wearable electronic device in which a reflection member is disposed in a support member according to an embodiment of the present disclosure.

FIG. 5B is a view illustrating another example of a configuration of a wearable electronic device in which a reflector 590b is disposed in a support member according to an embodiment of the present disclosure.

Referring to FIG. 5B, the wearable electronic device 500 according to an embodiment may include a front plate 501, a display 520, a support member 530, a battery 570, a printed circuit board 540, a fingerprint sensor, a second reflector 590b, and a rear plate 507. In the above-mentioned configurations, the front plate 501, the display 520, the battery 570, the printed circuit board 540, and the fingerprint sensor may be the same as or similar to those of the wearable electronic device, which have been described above with reference to FIG. 5A.

The support member 530, for example, may include an upper positioning part and a lower positioning part 532, and an area (e.g., an area corresponding to an area in which the reflector 501d of the front plate 501 of FIG. 5A is disposed) of the upper positioning part may include a second reflector area 535b in which the second reflector 590b is disposed. The second reflector 590b may be configured to be concave from the center of the front plate 501 toward an outskirt thereof (or to be convex toward the rear plate 507 when viewed from the outskirt of the rear plate 507). The second reflector 590b having a form of a concave mirror may be disposed such that a focus thereof faces the center of the front plate 501. As the second reflector 590b is provided in a concave form (or a convex form with respect to the rear plate 507), the second reflector 535b also may be formed to correspond to the second reflector 590b such that one surface (e.g., on which the second reflector 590b is disposed) has a specific curvature. As mentioned above, the second reflector 590b may be a concave mirror having a specific curvature such that information of a fingerprint 10 of a relatively large area may be contained in a finger sensor of a relatively small area.

In the above-mentioned wearable electronic device 500, the second reflector 590b may concentrate light reflected by the fingerprint 10 in contact with the front plate 501 more efficiently and direct the concentrated light to the fingerprint sensor 580 disposed on a side surface of the front plate 501, which is opposite to the first side surface because the second reflector 590b is formed to be concave in a direction that faces a specific portion (e.g., a portion which the fingerprint 10 contacts or a central portion) of the front plate 501. Further, the wearable electronic device, to which the above-mentioned reflector is applied, may secure improved fingerprint data by inputting fingerprint data toward the front surface of the fingerprint sensor by using the reflector.

Figure 6A:
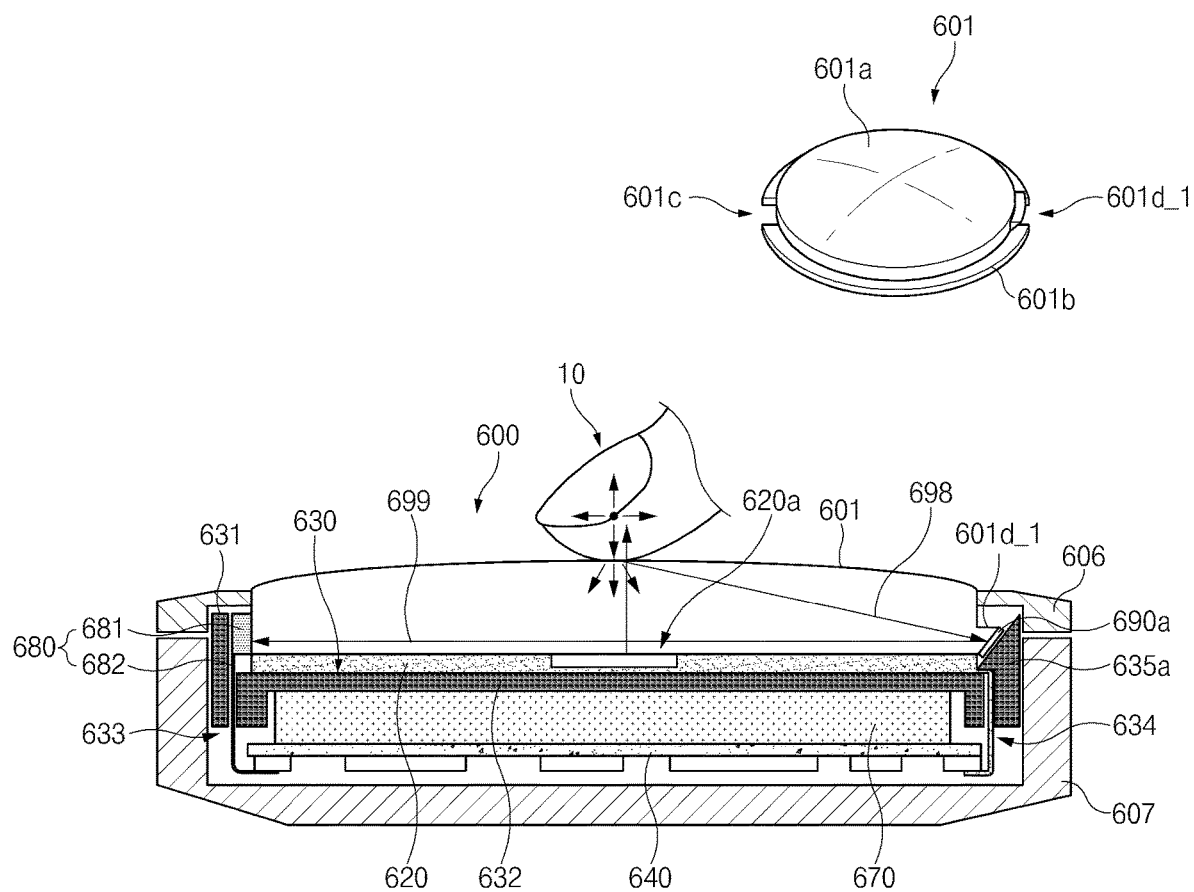
FIG. 6A is a view illustrating an example of a configuration of a wearable electronic device in which a reflection member is disposed in a front plate according to an embodiment of the present disclosure.

FIG. 6A is a view illustrating an example of a configuration of a wearable electronic device in which a reflector 690a is disposed in a front plate according to an embodiment of the present disclosure.

Referring to FIG. 6A, the wearable electronic device 600 according to an embodiment may include a front plate 601, a first reflector 690a disposed on one side of the front plate 601, a display 620, a housing 606, a support member 630, a battery 670, a printed circuit board 640, a fingerprint sensor 680 and a rear plate 607. Additionally or alternatively, at least one of the components described above with reference to FIGS. 1 to 3 may be included.

In the above-mentioned configuration, the display 620, the housing 606, the battery 670, the printed circuit board 640, the fingerprint sensor 680, and the rear plate 607 may be the same as or similar to the display 520, the housing 501, the battery 570, the printed circuit board 540, the fingerprint sensor 580, and the rear plate 507 described above with reference to FIG. 5A. The fingerprint sensor 680 may include a sensor part 681 and a sensor wiring part 682.

The front plate 601 may include a central area 601a formed such that the thickness of a central portion thereof is larger than the thickness of an edge portion thereof and an edge 601b surrounding a periphery of the central area 601a, and a first reflector disposition part 601d_1 and a sensor disposition recess 601c may be provided on opposite sides of the edge 601b. The first reflector disposition part 601d_1 and the sensor disposition recess 601c may be disposed to be symmetrical, substantially symmetrical, or within 1~10% (for example, 5%) deviation of symmetrical to each other with respect to the central area 601a. The sensor disposition recess 601c may be formed while one side of the edge 601b is removed.

The first reflector disposition part 601d_1 protrudes from a specific area of a side of the central area 601a outwards, and the sectional area of the first reflector disposition part 601d_1 gradually decreases from the upper side toward the lower side to form a specific inclined surface. The angle of the inclined surface of the first reflector disposition part 601d_1 may be configured such that light may be irradiated toward the fingerprint sensor 680 disposed on an opposite side of the front plate 601 by changing an optical path of light or directing light reflected from the center of the front plate 601 (e.g., by changing optical path 698 to optical path 699) while the attached first reflector 690a faces a central portion of the front plate 601. The first reflector 690a may be fixed to the first reflector disposition part 601d_1.

The support member 630 may include an upper positioning part 631 on which the front plate 601 and the display 620 are positioned, a lower positioning part 632 on which the battery 670 is positioned, a first wiring hole 633, through which the sensor wiring part 680 disposed in the fingerprint sensor 682 passes, and a second wiring hole 634, through which the display wiring part 621 passes. The upper positioning part 631 may include a vessel form, the bottom of which is flat as a whole. An area of one side of the upper positioning part 631, in which the fingerprint sensor 680 is disposed, may be relatively thin as compared with the other areas. A first reflector area 635a of one side of the upper positioning part 631, in which the first reflector 690a is disposed, may protrude further than the edge area thereof. For example, the first reflector area 635a may be configured such that the sectional area thereof decreases from the lower side toward the upper side. A specific interval may be provided between the first reflector area 635a and the first reflector 690a or an adhesive may be disposed between the first reflector area 635a and the first reflector 690a.

The first reflector 690a may be disposed in the first reflector disposition part 601d_1 of the front plate 601. The first reflector 690a, for example, may be configured such that front and rear surfaces thereof are flat and be configured to reflect light on the front surface thereof. The first reflector 690a may be configured such that a focus thereof faces a central portion of the front plate 601, and may be disposed such that the light received from the central portion of the front plate 601 may be directed to the fingerprint sensor 680 disposed on an opposite side of the front plate 601 with respect to the central area 601a of the front plate 601. In this regard, the first reflector 690a may be bonded and fixed to the first reflector disposition part 601d_1 having a specific inclination.

According to an embodiment, the wearable electronic device 600 may irradiate light to a specific area (e.g., a central area) of the front plate 601 through the light irradiation area 620a of the display 620. Accordingly, as the light reflected by the fingerprint 10 in contact with a surface of the front plate 601 is reflected by the first reflector 690a attached to one side of the front plate 601, the light reflected by the first reflector 690a may be directed to the fingerprint sensor 680 through a side surface of the front plate 601. In this process, because the first reflector 690a is directly bonded to the surface of the front plate 601, the first reflector 690a may refract the light that is necessary for sensing a fingerprint toward the fingerprint sensor 680 without additional refraction of the light due to an additional medium (e.g., air).

Figure 6B:
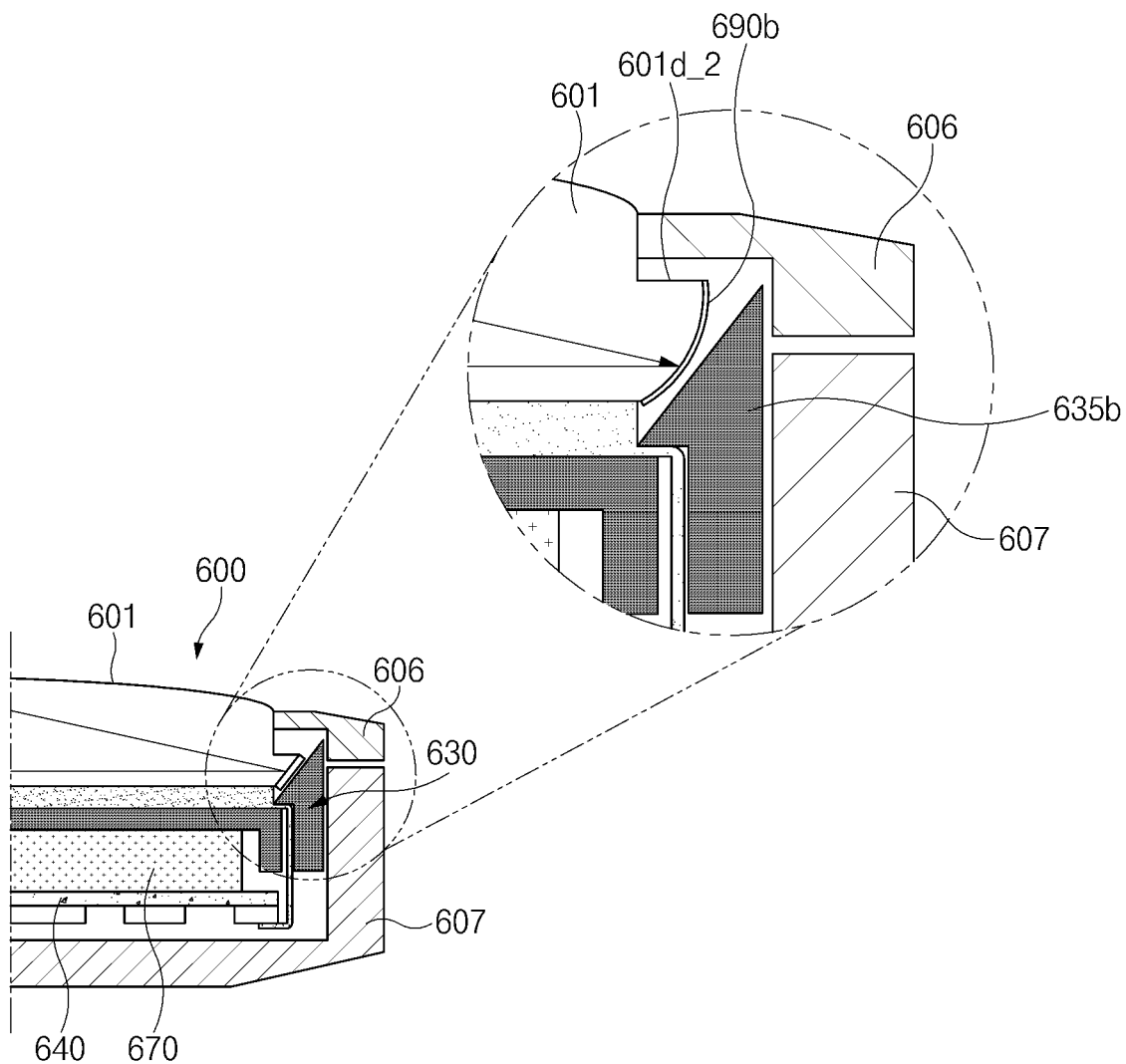
FIG. 6B is a view illustrating another example of a configuration of a wearable electronic device in which a reflection member is disposed in a front plate according to an embodiment of the present disclosure.

FIG. 6B is a view illustrating another example of a configuration of a wearable electronic device in which a reflector 690b is disposed in a front plate according to an embodiment of the present disclosure.

Referring to FIG. 6B, the wearable electronic device 600 according to an embodiment may include a display 620, a support member 630, a battery 670, a printed circuit board 640, a fingerprint sensor, a second reflector 690b, and a rear plate 607. In the above-mentioned configuration, the display 620, the battery 670, the printed circuit board 640, the fingerprint sensor, and the support member 630 may be the same as or similar to those of the wearable electronic device 600 described above with reference to FIG. 6A.

The front plate 601 may include a central area, an edge, a sensor disposition recess, and a second reflector disposition part 601d_2. The second reflector disposition part 601d_2 may have an inclined surface, a sectional area of which gradually decreases as it goes from the upper side to the lower side, and the inclined surface may have a specific curvature. Accordingly, the second reflector disposition part 601d_2 may protrude to be rounded outwards when viewed from the outside.

The second reflector 690b may be disposed in the second reflector disposition part 601d_2 of the front plate 601. Because the second reflector disposition part 601d_2 has a specific curvature as described above, the second reflector 690b may be concave (when viewed from a central portion of the front plate 601 or convex when viewed from a direction of the rear plate 607) while having a specific curvature to correspond to the shape of the second reflector disposition part 601d_2. The second reflector 690b having a form of a concave mirror may be position to be focused at the top of the center of the front plate 601 or be disposed such that a focus thereof faces the center of the front plate 601.

In the above-mentioned wearable electronic device 600, the second reflector 690b may converge light reflected by the fingerprint 10 in contact with the front plate 601 more efficiently and direct the converged light to the fingerprint sensor disposed on a side surface of the front plate 601, which is opposite to the first side surface because the second reflector 690b is formed to be concave in a direction that faces a specific portion (e.g., a portion which the fingerprint 10 contacts or a central portion) of the front plate 601 and is fixed to the front plate 601 while directly facing the front plate 601.

Figure 7:
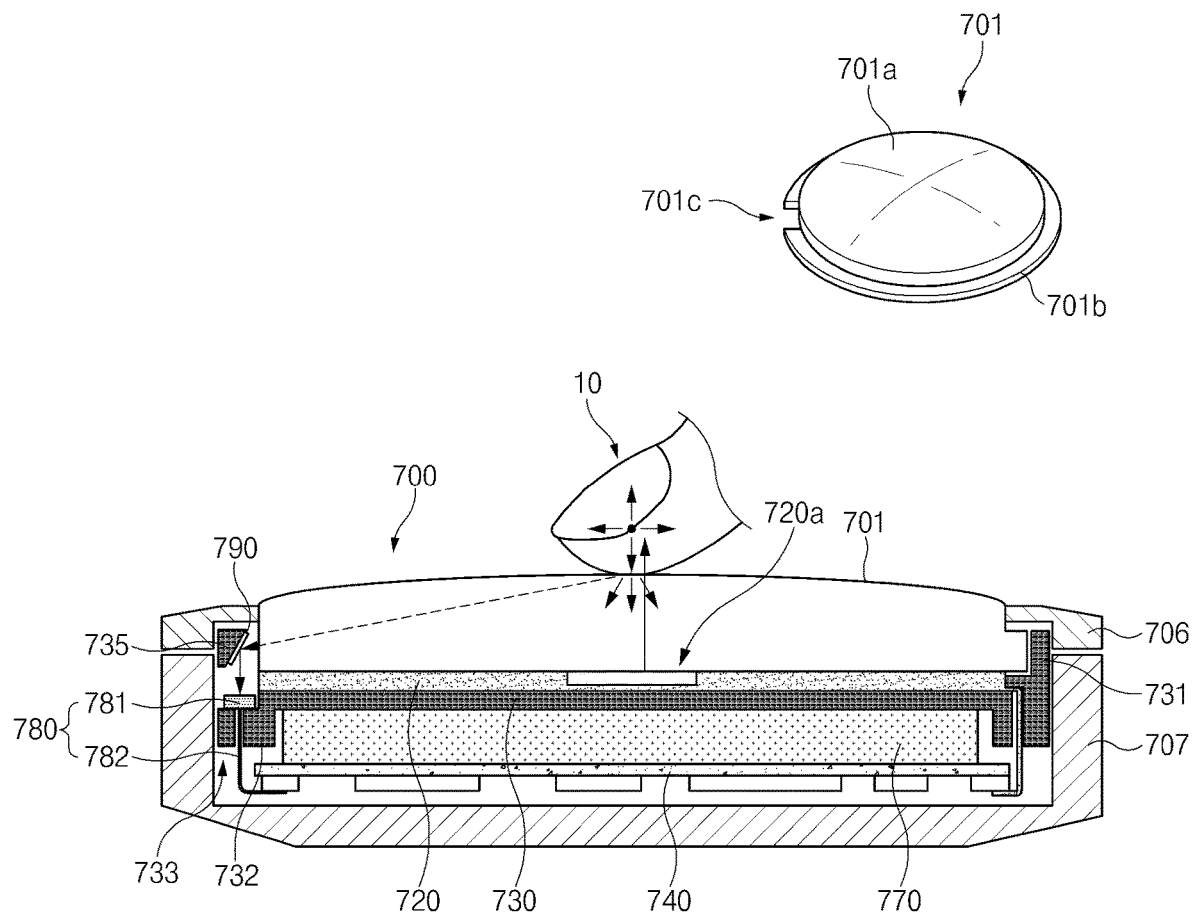
FIG. 7 is a view illustrating an example of a configuration of a wearable electronic device in which a reflection member and a fingerprint sensor are disposed to be adjacent to each other according to an embodiment of the present disclosure.

FIG. 7 is a view illustrating an example of a configuration of a wearable electronic device in which a reflector 790 and a fingerprint sensor 780 are disposed to be adjacent and proximate to each other according to an embodiment of the present disclosure. Reflector 790 directs light to the fingerprint sensor along one edge of the housing 706.

Referring to FIG. 7, the wearable electronic device 700 according to an embodiment may include a front plate 701, a reflector 790 disposed on a side of the front plate 701 and an inside of the housing 706, a fingerprint sensor 780 disposed to be adjacent to an area in which the reflector 790 is disposed, a display 720, the housing 706, a support member 730, a battery 770, a printed circuit board 740, and a rear plate 707. Additionally or alternatively, at least one of the components described above with reference to FIGS. 1 to 3 may be included.

In the above-mentioned configuration, the display 720, the housing 706, the battery 770, the printed circuit board 740, and the rear plate 707 may be the same as or similar to the display 420, the housing 401, the battery 470, the printed circuit board 440, and the rear plate 407 described above with reference to FIG. 4.

The front plate 701 may include a central area 701a and an edge 701b surrounding a periphery of the central area 701a, and the reflector 790 and a sensor disposition recess 701c in which the fingerprint sensor 780 is disposed may be provided on one side of the edge 701b. The sensor disposition recess 701c may be formed while a portion of the edge 701b is removed.

The support member 730 may include an upper positioning part 731 on which the front plate 701 and the display 720 are positioned, a lower positioning part 732 on which the battery 770 is positioned, a first wiring hole 733, through which the sensor wiring part 780 disposed in the fingerprint sensor 780 passes, and a second wiring hole, through which the display wiring part passes. The upper positioning part 731 may include a vessel form, the bottom of which is flat as a whole. An area (or an area corresponding to an area in which the sensor disposition recess 701c is formed) of one side of the upper positioning part 731, in which the reflector 790 and the fingerprint sensor 780 are disposed, may be relatively thin as compared with the other areas or may have a form of a hole that passes the front and rear sides of the side surface. A reflector area 735 of the upper positioning part 731, in which the reflector 790 is disposed, may have a specific inclination angle. Accordingly, the reflector 790 may direct the light reflected from a central portion toward the fingerprint sensor 780 disposed under the front plate 701.

The reflector 790 may be formed on one side of the support member 730 while having a specific inclination. The reflector 790 may be disposed in parallel to a specific area of a side of the front plate 701. The reflector 790, for example, may have flat front and rear surfaces or may have a concave shape. The reflector 790 may be configured such that a focus thereof faces a central portion of the front plate 701, and may be disposed such that the light reflected from the central portion of the front plate 701 may be directed to the fingerprint sensor 780 disposed under the edge 701b of the front plate 701. The reflector 790 may be fixed to the reflector area 735 of the upper positioning part 731 having a specific inclination through an adhesive.

The fingerprint sensor 780 may include a sensor part 781 and a sensor wiring part 782. The fingerprint sensor 780 may be fixed to one side of an edge of the support member 730, and may be disposed to face a forward direction of the wearable electronic device 700 with reference to the illustrated drawings. The reflector 790 may be disposed on the fingerprint sensor 780 so that the fingerprint sensor 780 may collect the light directed from a central portion of the front plate 701 to an edge of the front plate 701 through the reflector 790.

According to an embodiment of the present disclosure, in the wearable electronic device 700, the light is irradiated to a specific area (e.g., a central area) of the front plate 701 through a light irradiation area 720a of the display 720, and the light reflected by the fingerprint 10 in contact with a surface of the front plate 701 may be reflected by the reflector 790 disposed on a side of the front plate 701 and be directed to the fingerprint sensor 780. The wearable electronic device 700 having the structure may be configured such that the fingerprint sensor 780 is spaced apart from the reflector 790 by a specific interval to easily secure a focal distance of the fingerprint sensor 780.

Figure 8:
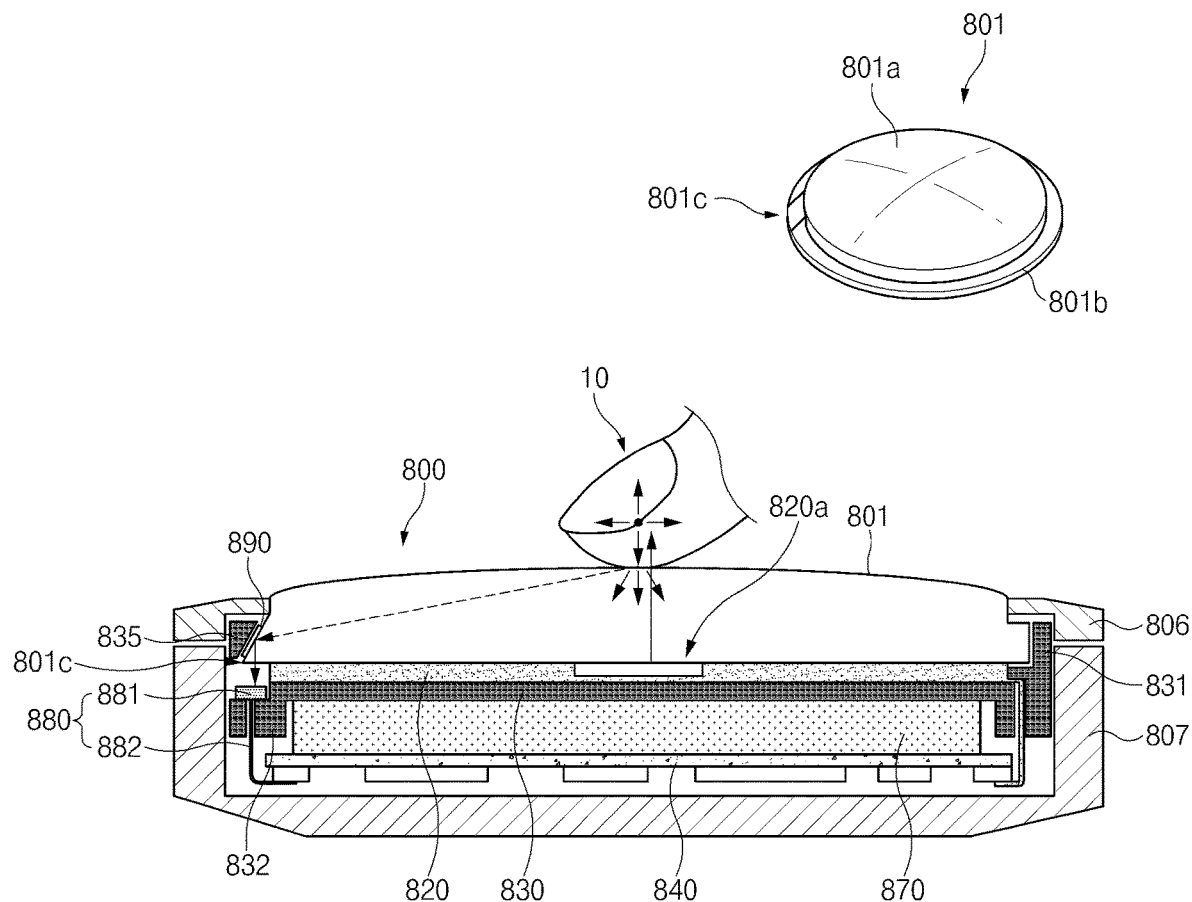
FIG. 8 is a view illustrating another example of a configuration of a wearable electronic device in which a reflection member and a fingerprint sensor are disposed to be adjacent to each other according to an embodiment of the present disclosure.

FIG. 8 is a view illustrating another example of a configuration of a wearable electronic device in which a reflector 890 and a fingerprint sensor 880 are disposed to be adjacent to each other according to an embodiment of the present disclosure.

Referring to FIG. 8, the wearable electronic device 800 according to an embodiment may include a front plate 801, a reflector 890 disposed on one side of the front plate 801, a fingerprint sensor 880 disposed to be adjacent to an area in which the reflector 890 is disposed, a display 820, a housing 806, a support member 830, a battery 870, a printed circuit board 840, and a rear plate 707. Additionally or alternatively, at least one of the components described above with reference to FIGS. 1 to 3 may be included.

In the above-mentioned configuration, the display 820, the housing 806, the battery 870, the printed circuit board 840, and the rear plate 807 may be the same as or similar to the display 420, the housing 401, the battery 470, the printed circuit board 440, and the rear plate 407 described above with reference to FIG. 4.

The front plate 801 may include a central area 801a and an edge 801b surrounding a periphery of the central area 801a, and at least one boss 801c which the reflector 890 is disposed may be provided on one side of the edge 801b. At least one boss 801c can include a protrusion. The boss 801c may protrude from the central area 801a toward the edge 801b by a specific width. A sectional area of the boss 801c gradually increases as it goes from the upper side to the lower side, and the boss 801c may have an inclined surface. The reflector 890 may be attached to the inclined surface of the boss 801c while having a specific inclination. The fingerprint sensor 880 may be disposed under the boss 801c. According to certain embodiments, the inclined surface of the boss 801c may have a specific curvature.

The support member 830 may include an upper positioning part 831 on which the front plate 801 and the display 820 are positioned, a lower positioning part 832 on which the battery 870 is positioned, a first wiring hole, through which the sensor wiring part 882 disposed in the fingerprint sensor 880 passes, and a second wiring hole, through which the display wiring part passes. The upper positioning part 831 may include a vessel form, the bottom of which is flat as a whole. The reflector area 835 (or an area corresponding to an area in which the boss 801c is formed) corresponding to an area of one side of the upper positioning part 831, in which the reflector 890 is disposed may have a specific inclination surface to correspond to the inclined surface of the boss 801c. The reflector area 835 of the upper positioning part 831 may be disposed to be spaced apart from the boss 801c by a specific interval, or a bonding layer in relation to the fixing of the boss 801c may be disposed between the reflector area 835 of the upper positioning part 831 and the boss 801c.

The reflector 890 may be formed in the boss 801c of the front plate 801 while having a specific inclination. The reflector 890, for example, may have flat front and rear surfaces or may have a concave shape. The reflector 890 may be configured such that a focus thereof faces a central portion of the front plate 801, and may be disposed such that the light directed from the central portion of the front plate 801 may be directed to the fingerprint sensor 880 disposed under the boss 801c. The reflector 890 may be fixed to the reflector area 831 of the upper positioning part 835 having a specific inclination through an adhesive.

The fingerprint sensor 880 may include a sensor part 881 and a sensor wiring part 882. The fingerprint sensor 880 may be fixed to a lower portion of the boss 801c of the front plate 801, and may be disposed to face a forward direction of the wearable electronic device 800 with reference to the illustrated drawings. The boss 801c and the reflector 890 may be disposed on the fingerprint sensor 880, and accordingly, the fingerprint sensor 880 may collect the light directed from a central portion of the front plate 801 to an edge of the front plate 701 through the reflector 890.

According to an embodiment of the present disclosure, in the wearable electronic device 800, the light is irradiated to a specific area (e.g., a central area) of the front plate 801 through a light irradiation area 820a of the display 820, and the light reflected by the fingerprint in contact with a surface of the front plate 801 may be reflected by the reflector 890 disposed on a side of the front plate 801 and be directed to the fingerprint sensor 880. In the wearable electronic device 800 having the above-mentioned structure, a focal distance of the fingerprint sensor 880 may be easily secured because the fingerprint sensor 880 is spaced apart from the reflector 890 by a specific interval, and the reflector 890 and the front plate 801 are bonded to each other so that refraction due to the structure (e.g., a structure having an air layer between the reflector 890 and the front plate 801) having an additional medium may be reduced.

Figure 9:
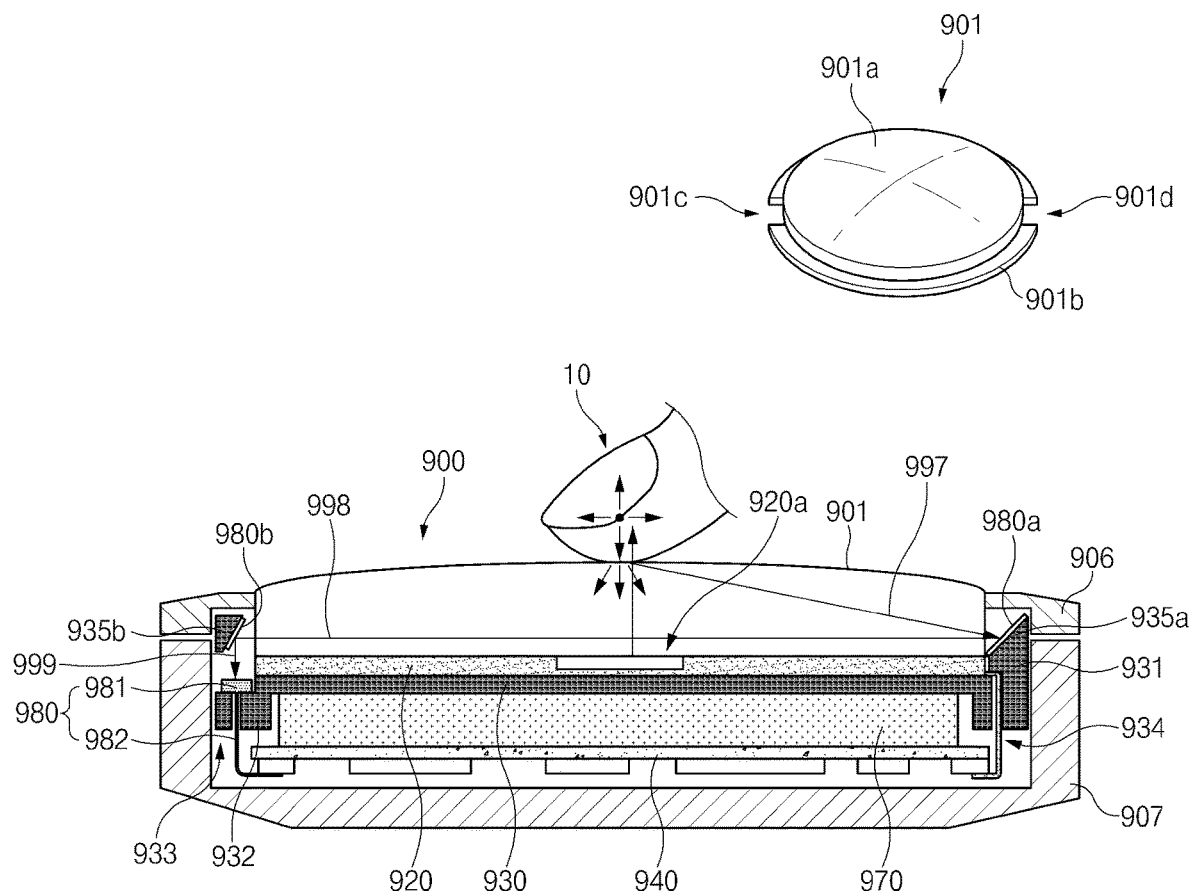
FIG. 9 is a view illustrating an example of a configuration of a wearable electronic device in which a plurality of reflection members are disposed according to an embodiment of the present disclosure.

As described above, in the wearable electronic device, a path of optical data (or fingerprint data or a sensing signal) may be long because fingerprint data related to the fingerprint 10 may be guided to the fingerprint sensor by using the reflector, and a shielding effect of the support member (e.g., an effect of interrupting unnecessary data (external light other than the light reflected by the fingerprint) obtained in a shape in which the fingerprint is simply disposed on a side of the support member) may be provided by mounting the fingerprint sensor 880 on a lower side of the support member may be provided FIG. 9 is a view illustrating an example of a configuration of a wearable electronic device in which a plurality of reflectors 980a and 980b are disposed according to an embodiment of the present disclosure.

Referring to FIG. 9, the wearable electronic device 900 according to an embodiment may include a front plate 901, a first reflector 990a, a second reflector 990b, a fingerprint sensor 980, a display 920, a housing 906, a support member 930, a battery 970, a printed circuit board 940, and a rear plate 707. Additionally or alternatively, at least one of the components described above with reference to FIGS. 1 to 3 may be included.

In the above-mentioned configuration, the display 920, the housing 906, the battery 970, the printed circuit board 940, and the rear plate 907 may be the same as or similar to the display 420, the housing 401, the battery 470, the printed circuit board 440, and the rear plate 407 described above with reference to FIG. 4.

The front plate 901 may include a central area 901a formed such that the thickness of a central portion thereof is larger than the thickness of an edge thereof and an edge 901b surrounding a periphery of the central area 901a, and a first recess 901d for providing a specific space in relation to disposition of the first reflector 990a and a second recess 901c for providing a specific space in relation to disposition of the second reflector 990d and the fingerprint sensor 980 may be provided on one side of the edge 901b. The first recess 901d and the second recess 901c may be provided by removing some areas of the edge 901b. The first recess 901d and the second recess 901c may be provided at locations that are symmetrical, substantially symmetrical, or within 1~10% (for example, 5%) deviation of symmetrical to each other with respect to the central area 901a of the front plate 901.

The support member 930 may include an upper positioning part 931 on which the front plate 901 and the display 920 are positioned, a lower positioning part 932 on which the battery 970 is positioned, a first wiring hole 933, through which the sensor wiring part 982 disposed in the fingerprint sensor 980 passes, and a second wiring hole 934, through which the display wiring part passes. A first reflector area 935a that is adjacent to an area of the upper positioning part 931, in which the first reflector 990a is disposed, may have an inclined surface having a specific width such that the first reflector 990a may be positioned while having a specific inclination. A second reflector area 935b that is adjacent to an area of the upper positioning part 931, in which the second reflector 990b is disposed, may have an inclined surface having a specific width such that the second reflector 990b may be positioned while having a specific inclination. The inclined surface of the first reflector area 935a and the inclined surface of the second reflector area 935b may be disposed to face each other while the front plate 901 located at the center thereof, and the inclination directions of the inclined surfaces may be opposite to each other. The thickness of the upper positioning part 931 of a periphery of the second reflector area 935b may be relatively small as compared with the other areas of the upper positioning part 931 or a hole that passes through the front and rear surfaces of the upper positioning part 931 may be provided.

The first reflector 990a may be disposed in the first reflector area 935a of the support member 930 while having a specific inclination. The first reflector 990a may be disposed to have a specific inclination such that the light reflected from the central portion of the front plate 901 may be directed toward the second reflector 990b. The first reflector 990a may be fixed to the first reflector area 935a based on an adhesive layer. A surface of the first reflector 990a, which faces the front plate 901, may be flat or may be concave in relation to improvement of light condensing efficiency.

The second reflector 990b may be disposed in the second reflector area 935b of the support member 930 while having a specific inclination. The second reflector 990b may be disposed to have a specific inclination such that the light directed by the first reflector 990a may be directed toward the fingerprint sensor 980. The second reflector 990b may be fixed to the second reflector area 935b based on an adhesive layer. A surface of the second reflector 990b, which faces a side of the front plate 901 or the fingerprint sensor 980, may be flat or may be concave in relation to improvement of light condensing efficiency.

The fingerprint sensor 980 may include a sensor part 981 and a sensor wiring part 982. The fingerprint sensor 980 may be fixed to a lower portion of second reflector 990b, and may be disposed to face a forward direction of the wearable electronic device 990 with reference to the illustrated drawings. Accordingly, the fingerprint sensor 980 may be disposed to be spaced apart from the second reflector 990b by a specific interval and to face the second reflector 990b.

According to an embodiment of the present disclosure, in the wearable electronic device 900, the light may be irradiated to a specific area (e.g., a central area) of the front plate 901 through a light irradiation area 920a of the display 720, and be reflected by the fingerprint 10 in contact with a surface of the front plate 901, the light directed to the first reflector 990a may be directed to the fingerprint sensor 980 after passing through a side of the front plate 901 and being reflected by the second reflector 990b disposed on a side of the front plate 901. The wearable electronic device 900 having the structure may have a relatively long focal distance because the distance at which the fingerprint sensor 980 collects light related to sensing of a fingerprint by the fingerprint 980 includes a spacing distance between the central portion of the front plate 901 and the first reflector 990a and a distance between the first reflector 990a and the second reflector 990b. Accordingly, the present disclosure allows a fingerprint sensor 980 to be used in the wearable electronic device 900 even though the fingerprint sensor 980 uses a lens (or lenses) that requires a relatively long focal distance.

Figure 10:
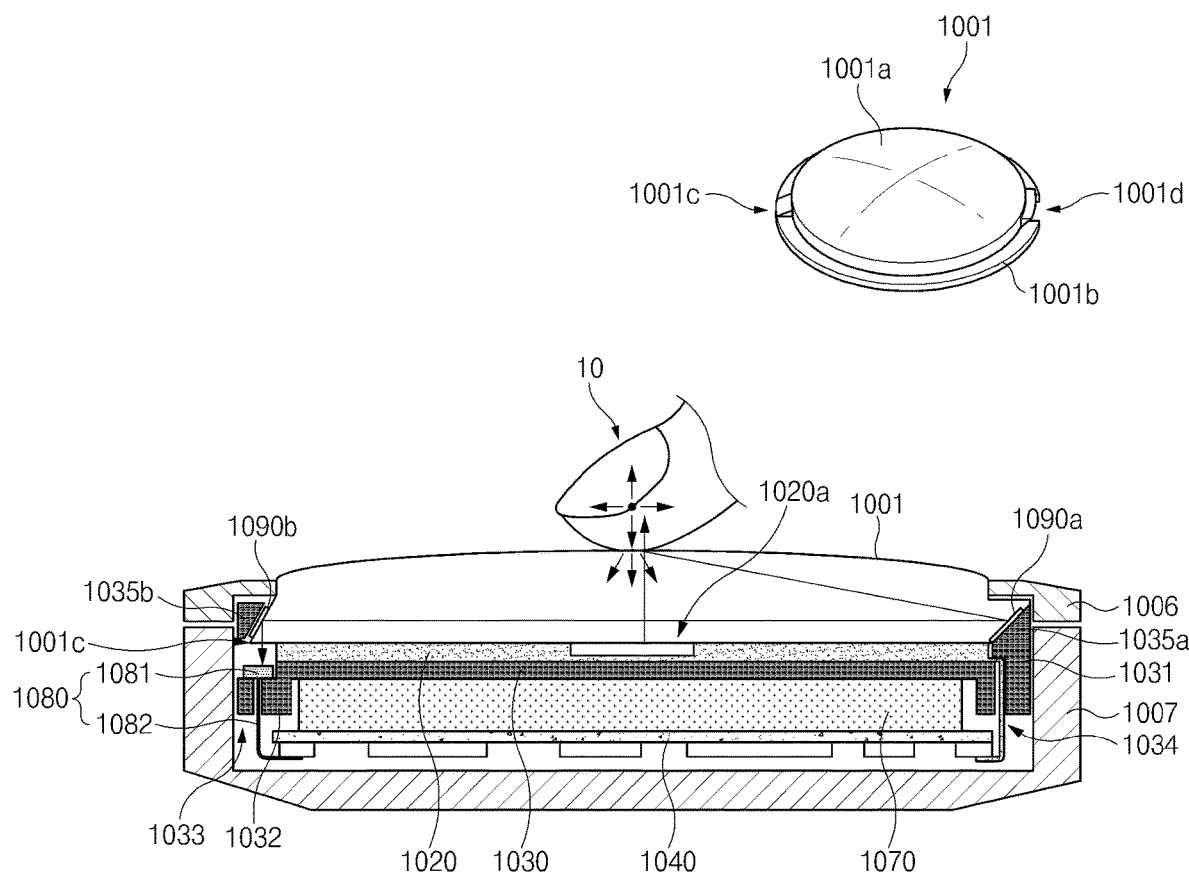
FIG. 10 is a view illustrating another example of a configuration of a wearable electronic device in which a plurality of reflection members are disposed according to an embodiment of the present disclosure.

FIG. 10 is a view illustrating another example of a configuration of a wearable electronic device in which a plurality of reflectors 1090a and 1090b are disposed according to an embodiment of the present disclosure.

Referring to FIG. 10, the wearable electronic device 1000 according to an embodiment may include a front plate 1001, a first reflector 1090a and a second reflector 1090b attached to the front plate 1001, a fingerprint sensor 1080, a display 1020, a housing 1006, a support member 1030, a battery 1070, a printed circuit board 1040, and a rear plate 1007. Additionally or alternatively, at least one of the components described above with reference to FIGS. 1 to 3 may be included.

In the above-mentioned configuration, the display 1020, the housing 1006, the battery 1070, the printed circuit board 1040, and the rear plate 1007 may be the same as or similar to the display 420, the housing 401, the battery 470, the printed circuit board 440, and the rear plate 407 described above with reference to FIG. 4.

The front plate 1001 may include a central area 1001a formed such that the thickness of a central portion thereof is larger than the thickness of a peripheral area thereof, and an edge 1001b surrounding a periphery of the central area 1001b, and a first boss 1001d in which the first reflector 1090a is disposed and a second boss 1001c in which the second reflector 1090b is disposed may be included on one side of the edge 1001b. The first boss 1001d and the second boss 1001c may be formed to protrude from opposite sides of the central area toward the edge 1001b while having a specific inclination. The first boss 1001d and the second boss 1001c may be provided at locations that are symmetrical, substantially symmetrical, or within 5% deviation of symmetrical to each other with respect to the central area 1001a of the front plate 1001.

The first boss 1001d may protrude from an outskirt of a side of the central area 1001a outwards. The first boss 1001d may have an inclination angle such that a sectional area of the first boss 1001d gradually decreases from the upper side to the lower side. The first reflector 1090a may be fixed to the inclined surface of the first boss 1001d.

The second boss 1001c may protrude from an outskirt of an opposite side of the central area 1001a, on which the first boss 1001d is formed, outwards. The second boss 1001c may have an inclination angle such that a sectional area of the second boss 1001c gradually decreases from the lower side to the upper side. The second reflector 1090b may be fixed to the inclined surface of the second boss 1001c.

The support member 1030 may include an upper positioning part 1031 on which the front plate 1001 and the display 1020 are positioned, a lower positioning part 1032 on which the battery 1070 is positioned, a first wiring hole 1033, through which the sensor wiring part 1081 disposed in the fingerprint sensor 1080 passes, and a second wiring hole 1034, through which the display wiring part passes. A first reflector area 1035a that is adjacent to an area of the upper positioning part 1031, in which the first reflector 1090a is disposed, may have an inclined surface having a specific width in correspondence to the first boss 1001d having a specific inclination and the first reflector 1090a.

A second reflector area 1035b that is adjacent to an area of the upper positioning part 1031, in which the second reflector 1090b is disposed, may have an inclined surface having a specific inclination in correspondence to the second boss 1001c having a specific inclination and the second reflector 1090b.

The inclined surface of the first reflector area 1035a and the inclined surface of the second reflector area 1035b may be disposed to face each other while the front plate 1001 located at the center thereof, and the inclination directions of the inclined surfaces may be opposite to each other. The thickness of the upper positioning part 1035 including the second reflector area 1035b may be relatively small as compared with the other areas of the upper positioning part 1031 or a hole that passes through the front and rear surfaces of the upper positioning part 1031 may be provided.

The first reflector 1090a may be fixed to the inclined surface of the first boss 1001d. According to certain embodiments, a specific gap may be formed or a bonding layer may be disposed between the first reflector 1090a and the first reflector area 1035a of the support member 1030 so that the first boss 1001d and the first reflector 1090a may be fixed to the first reflector area 1035a. The first reflector 1090a may be disposed to have a specific inclination such that an optical path of the light reflected from the central portion of the front plate 1001 may be changed and be directed toward the second reflector 1090b. A surface of the first reflector 1090a, which faces the front plate 1001, may be flat or may be concave in relation to improvement of light condensing efficiency.

The second reflector 1090a may be fixed to the inclined surface of the second boss 1001c. According to certain embodiments, a specific gap may be formed or a bonding layer may be disposed between the second reflector 1090b and the second reflector area 1035b of the support member 1030 so that the second boss 1001c and the second reflector 1090b may be fixed to the second reflector area 1035b. A surface of the second reflector 1090b, which faces a side of the front plate 1001 or the fingerprint sensor 1080, may be flat or may be concave in relation to improvement of light condensing efficiency.

The fingerprint sensor 1080 may be fixed to the second boss 1001*c* and a lower portion of second reflector 1090*b*, and may be disposed to face a forward direction of the wearable electronic device 1000 with reference to the illustrated drawings. Accordingly, the fingerprint sensor 1080 may be disposed to be spaced apart from the second reflector 1090*b* by a specific interval and to face the bottom surface of the second boss 1001*c* and the second reflector 1090*b*.

According to an embodiment, the wearable electronic device 1000 may irradiate light to a specific area (e.g., a central area) of the front plate 1001 through the light irradiation area 1020*a* of the display 1020. The light reflected by the fingerprint 10 in contact with a surface of the front plate 1001 may be refracted by the first reflector 1090*a* attached to the inclined surface of the first boss 1001*d*, and may be directed to the fingerprint sensor 1080 after passing through a side of the front plate 1001 and being reflected by the second reflector 1090*b* attached to the inclined surface of the second boss 1001*c*. The wearable electronic device 1000 having the structure may be applied even though a focal distance of the fingerprint sensor 1080 is long, and may restrain loss of light by reducing a gap between the reflector and the front plate.

The wearable electronic device described above with reference to FIGS. 9 and 10 may easily realize the angles of the reflectors by using the plurality of reflectors. Additionally, the at least one reflector described above with reference to FIGS. 4 to 10 may have a concave mirror shape to improve the light condensing effect.

According to certain embodiments, an electronic device includes a transparent member, a display disposed under the transparent member and including an active area, in which a plurality of pixels capable of outputting light to display contents, a biometric sensor disposed in a first area outside the active area, and a reflector capable of changing an optical path of reflected light reflected by an external object in contact with at least a partial area of the transparent member, among light that is output from at least some of the plurality of pixels, such that at least a portion of the reflected light is directed to the biometric sensor through at least a portion of the transparent member.

According to certain embodiments, a wearable electronic device includes a front plate having a specific transparency, a display under the front plate, a housing, at least a portion of which surrounds an edge of the front plate, a support member on which the front plate and the display are positioned, and a rear plate on which the support member is positioned and coupled to the housing, and the wearable electronic device further includes a fingerprint sensor disposed on a side of the front plate and under the edge of the housing and configured to collect light related to a fingerprint in contact with a specific area of the front plate to sense the fingerprint.

According to certain embodiments, the fingerprint sensor may have a state in which a focus of the light reflected in a specific area of the front plate is adjusted such that the light is collected.

According to certain embodiments, the wearable electronic device may further include a reflector disposed at a location that is substantially symmetrical to the fingerprint sensor with respect to the front plate and disposed such that the light reflected by the fingerprint in contact with a specific area of the front plate is directed toward the fingerprint sensor.

According to certain embodiments, the reflector may have a shape that is concave toward the front plate.

According to certain embodiments, the fingerprint sensor may be disposed to face the reflector to collect light directed while crossing a side of the front plate.

According to certain embodiments, the front plate may include a boss protruding toward a direction in which the reflector is disposed while having a specific inclination angle, and the reflector may be attached to an inclined surface of the boss.

According to certain embodiments, the fingerprint sensor may set a spacing distance from the reflector and a spacing distance from the reflector to a specific area of the front plate as a focal distance.

According to certain embodiments, the wearable electronic device may further include a bonding layer provided between the reflector and the support member.

According to certain embodiments, the wearable electronic device may further include a reflector disposed to collect light reflected by the fingerprint in contact with a specific area of the front plate and direct the collected light toward the fingerprint sensor disposed under the reflector.

According to certain embodiments, the reflector may have a shape that is concave toward the front plate.

According to certain embodiments, the front plate may include a boss protruding toward a direction in which the reflector is disposed while having a specific inclination angle, and the reflector may be attached to an inclined surface of the boss.

According to certain embodiments, the fingerprint sensor may sets a spacing distance from the reflector and a spacing distance from the reflector to a specific area of the front plate as a focal distance.

According to certain embodiments, the wearable electronic device may further include a bonding layer provided between the reflector and the support member.

According to certain embodiments, the wearable electronic device may further include a first reflector disposed at a location that is symmetrical, substantially symmetrical, or within 5% deviation of symmetrical to the fingerprint sensor with respect to the front plate and configured to reflect light reflected by the fingerprint in contact with a specific area of the front plate, and a second reflector disposed to collect the light reflected by the first reflector after the light passes through the front plate and to direct the collected light toward the fingerprint sensor.

According to certain embodiments, the fingerprint sensor may be disposed to be spaced apart from the second reflector under the second reflector.

According to certain embodiments, the front plate may include a first boss protruding toward a direction in which the first reflector is disposed while having a first inclination angle, and a second boss protruding toward a direction in which the second reflector is disposed while having a second inclination angle.

According to certain embodiments, the first inclination angle and the second inclination angle may be opposite to each other, the first reflector may be attached to an inclined surface of the first boss, and the second reflector may be attached to an inclined surface of the second boss.

According to certain embodiments, the fingerprint sensor may set any one of a spacing distance from the second reflector, a spacing distance between the first reflector and the second reflector, and a spacing distance between the second reflector and a specific area of the front plate as a focal distance.

According to certain embodiments, the wearable electronic device may further include a first bonding layer disposed between the first reflector and the support member, and a second bonding layer disposed between the second reflector and the support member.

Figure 11:
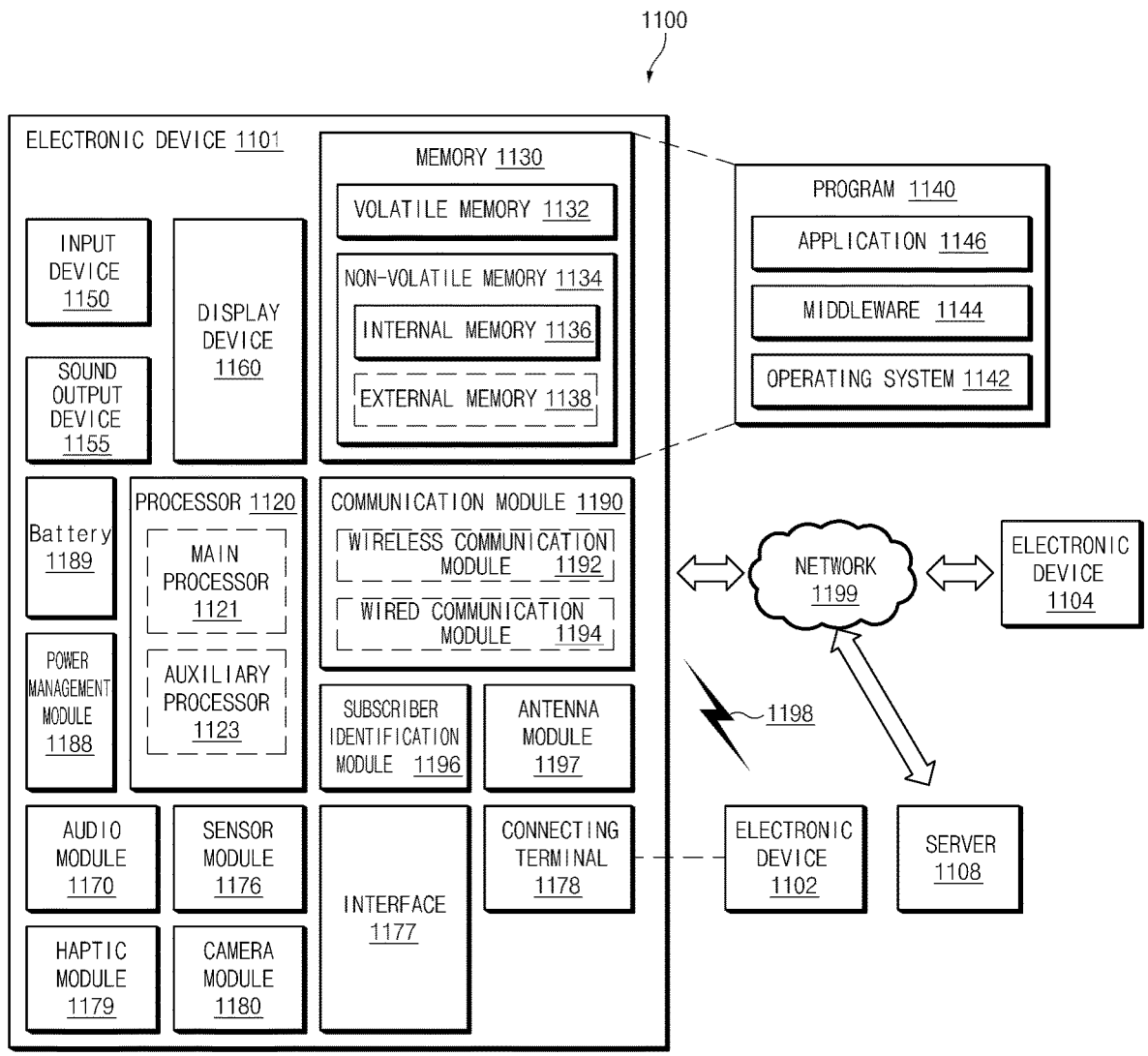
FIG. 11 is a block diagram of an electronic device in a network environment according to certain embodiments.

FIG. 11 is a block diagram illustrating an electronic device 1101 in a network environment 1100 according to various embodiments. Referring to FIG. 11, the electronic device 1101 in the network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment, the electronic device 1101 may communicate with the electronic device 1104 via the server 1108. According to an embodiment, the electronic device 1101 may include a processor 1120, memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In some embodiments, at least one (e.g., the display device 1160 or the camera module 1180) of the components may be omitted from the electronic device 1101, or one or more other components may be added in the electronic device 1101. In some embodiments, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to one embodiment, as at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to an embodiment, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment, the auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, a keyboard, or a digital pen (e.g., a stylus pen).

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to an embodiment, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment, the audio module 1170 may obtain the sound via the input device 1150, or output the sound via the sound output device 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment, the haptic module 1179 may include, for example, a motor, a piezoelectric element, or an electric stimulator.

The camera module 1180 may capture a still image or moving images. According to an embodiment, the camera module 1180 may include one or more lenses, image sensors, image signal processors, or flashes.

The power management module 1188 may manage power supplied to the electronic device 1101. According to one embodiment, the power management module 1188 may be implemented as at least part of, for example, a power management integrated circuit (PMIC).

The battery 1189 may supply power to at least one component of the electronic device 1101. According to an embodiment, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to an embodiment, the antenna module 1197 may include an antenna including a radiating element composed of a conductive material or a conductive pattern formed in or on a substrate (e.g., PCB). According to an embodiment, the antenna module 1197 may include a plurality of antennas. In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment, another component (e.g., a radio frequency integrated circuit (RFIC)) other than the radiating element may be additionally formed as part of the antenna module 1197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. According to an embodiment, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wearable electronic device comprising:
   a front plate having a specific transparency;
   a display under the front plate, wherein the display is substantially flat with respect to the front plate;
   a housing, at least a portion of which surrounds an edge of the front plate;
   a support member on which the front plate and the display are positioned;
   a rear plate on which the support member is positioned and coupled to the housing;
   a fingerprint sensor, wherein at least part of the fingerprint sensor is disposed on a side of the front plate and under an edge of the housing and configured to receive light related to a fingerprint of a finger in contact with a specific area of the front plate and to receive fingerprint information from the fingerprint; and
   a reflector positioned on another side of the front plate at a location that is substantially symmetrical to the fingerprint sensor and such that the light reflected by the fingerprint in contact with the specific area of the front plate is directed toward the fingerprint sensor, wherein the reflector is inclined such that a bottom portion of the reflector is closer to the fingerprint sensor than a top part of the reflector, and
   wherein the fingerprint sensor receives light reflected by the reflector directly from the light reflector.

2. The wearable electronic device of claim 1, wherein the fingerprint sensor is focused on the specific area of the front plate.

3. The wearable electronic device of claim 1, wherein the reflector has a shape that is concave toward the front plate.

4. The wearable electronic device of claim 1, wherein the fingerprint sensor is disposed to face the reflector to receive light directed while crossing the side of the front plate.

5. The wearable electronic device of claim 1, wherein the front plate includes:
   a protrusion protruding toward a direction in which the reflector is positioned while having a specific inclination angle, and
   wherein the reflector is attached to an inclined surface of the protrusion.

6. The wearable electronic device of claim 1, wherein a focal distance of the fingerprint sensor includes at least one of a spacing distance from the reflector and the spacing distance from the reflector to the specific area of the front plate.

7. The wearable electronic device of claim 1, further comprising:

a bonding layer provided between the reflector and the support member.

\* \* \* \* \*